(12) United States Patent
Khan et al.

(10) Patent No.: US 12,408,036 B1
(45) Date of Patent: Sep. 2, 2025

(54) CLOUD-MANAGED MOBILE PRIVATE NETWORK IMPLEMENTATION SERVERS EXECUTING MULTIPLE LAYERS OF RADIO-BASED TECHNOLOGY STACKS

(71) Applicant: Amazon Technologies, Inc., Seattle, WA (US)

(72) Inventors: Awaiz Ahmad Khan, Milpitas, CA (US); Yan Wang, Plano, TX (US)

(73) Assignee: Amazon Technologies, Inc., Seattle, WA (US)

( * ) Notice: Subject to any disclaimer, the term of this patent is extended or adjusted under 35 U.S.C. 154(b) by 454 days.

(21) Appl. No.: 18/066,943

(22) Filed: Dec. 15, 2022

(51) Int. Cl.
*H04W 12/086* (2021.01)
*G06F 8/61* (2018.01)
*H04W 12/033* (2021.01)
*H04W 12/30* (2021.01)

(52) U.S. Cl.
CPC ............ *H04W 12/086* (2021.01); *G06F 8/61* (2013.01); *H04W 12/033* (2021.01); *H04W 12/30* (2021.01)

(58) Field of Classification Search
CPC . H04W 12/086; H04W 12/033; H04W 12/30; G06F 8/61
See application file for complete search history.

(56) References Cited

U.S. PATENT DOCUMENTS

| | | |
|---|---|---|
| 8,539,079 B2 | 9/2013 | Thireault |
| 9,125,047 B2 | 9/2015 | Sundaresan et al. |
| 9,703,660 B2 | 7/2017 | Cillis et al. |
| 9,838,268 B1 | 12/2017 | Mattson |
| 9,876,851 B2 | 1/2018 | Chandramouli et al. |
| 10,064,242 B2 | 8/2018 | Pawar et al. |
| 10,135,702 B2 | 11/2018 | Lahiri |
| 10,244,507 B2 | 3/2019 | Tarlazzi et al. |
| 10,257,105 B2 | 4/2019 | Majmundar et al. |
| 10,419,550 B2 | 9/2019 | Nainar et al. |
| 10,581,717 B2 | 3/2020 | Tejaprakash et al. |
| 10,594,456 B2 | 3/2020 | Park et al. |
| 10,608,734 B2 | 3/2020 | Barbieri et al. |
| 10,705,808 B2 | 7/2020 | Chiosi et al. |
| 10,749,721 B2 | 8/2020 | Fertonani et al. |
| 10,750,514 B2 | 8/2020 | Fujinami |

(Continued)

FOREIGN PATENT DOCUMENTS

WO 2014073949 A1 5/2014

OTHER PUBLICATIONS

U.S. Appl. No. 18/630,891, filed Apr. 9, 2024, Shevade, et al.
(Continued)

*Primary Examiner* — Richard G Keehn
(74) *Attorney, Agent, or Firm* — Robert C. Kowert; Kowert, Hood, Munyon, Rankin & Goetzel, P.C.

(57) ABSTRACT

After a server for implementing a plurality of layers of a radio-based application has been powered on at a location external to a cloud computing environment, connectivity between the server and a monitoring service of a cloud computing environment is verified. Network functions of a radio unit, a distributed unit, a centralized unit, and a core network layer are all executed at the server with respect to a message received from a user equipment device. Status information of the server, collected from the server by the monitoring service, is presented via a programmatic interface.

20 Claims, 11 Drawing Sheets

(56) References Cited

U.S. PATENT DOCUMENTS

| | | | |
|---|---|---|---|
| 10,817,409 | B2 | 10/2020 | Zeng et al. |
| 10,880,173 | B2 | 12/2020 | Seenappa et al. |
| 10,944,668 | B2 | 3/2021 | Rajagopal |
| 10,959,098 | B2 | 3/2021 | Cidon et al. |
| 10,999,783 | B2 | 5/2021 | Pateromichelakis |
| 11,190,413 | B1 | 11/2021 | Priya et al. |
| 11,356,500 | B1 | 6/2022 | Gupta et al. |
| 11,539,582 | B1 | 12/2022 | Gupta et al. |
| 11,552,842 | B2 | 1/2023 | Barabell |
| 11,720,425 | B1 | 8/2023 | Yang |
| 11,743,117 | B2 | 8/2023 | Gupta |
| 11,800,404 | B1 | 10/2023 | Yang |
| 11,824,943 | B1 | 11/2023 | Krasilnikov et al. |
| 11,838,151 | B1* | 12/2023 | Jones ................ H04L 25/0224 |
| 11,916,999 | B1 | 2/2024 | Gupta |
| 11,937,103 | B1 | 3/2024 | Krasilnikov |
| 11,985,065 | B2 | 5/2024 | Shevade et al. |
| 12,126,455 | B2* | 10/2024 | Mehta ..................... G06F 11/14 |
| 12,177,092 | B2* | 12/2024 | Adriaanse ............... H04L 41/16 |
| 12,255,951 | B1* | 3/2025 | Gupta .................... H04L 67/567 |
| 2012/0127151 | A1 | 5/2012 | Murakami |
| 2018/0146375 | A1 | 5/2018 | Pawar et al. |
| 2018/0365635 | A1 | 12/2018 | Lucrecio et al. |
| 2019/0042326 | A1 | 2/2019 | Chilikin |
| 2019/0045037 | A1 | 2/2019 | Sukhomlinov |
| 2019/0158606 | A1 | 5/2019 | Guim Bernat et al. |
| 2019/0165906 | A1 | 5/2019 | Bala et al. |
| 2019/0190785 | A1 | 6/2019 | Power |
| 2019/0213029 | A1 | 7/2019 | Liu et al. |
| 2019/0230046 | A1 | 7/2019 | Djukic |
| 2019/0289497 | A1 | 9/2019 | Rajagopal |
| 2019/0294446 | A1 | 9/2019 | Liguori |
| 2019/0391855 | A1 | 12/2019 | Bernat et al. |
| 2019/0394826 | A1 | 12/2019 | Wang et al. |
| 2020/0245229 | A1 | 7/2020 | Horn et al. |
| 2021/0006944 | A1 | 1/2021 | Raghothaman et al. |
| 2021/0073047 | A1 | 3/2021 | Bhandaru |
| 2021/0144517 | A1 | 5/2021 | Guim Bernat et al. |
| 2021/0144555 | A1 | 5/2021 | Kim et al. |
| 2021/0152449 | A1 | 5/2021 | Wang |
| 2021/0243770 | A1 | 8/2021 | Roessler |
| 2021/0258866 | A1 | 8/2021 | Chou |
| 2021/0271517 | A1 | 9/2021 | Guim Bernat |
| 2022/0019667 | A1 | 1/2022 | Sood |
| 2022/0030117 | A1* | 1/2022 | Young ................... H04L 43/065 |
| 2022/0046084 | A1 | 2/2022 | Nair |
| 2022/0070734 | A1 | 3/2022 | Rajagopal |
| 2022/0353680 | A1* | 11/2022 | Hu ....................... H04W 12/069 |
| 2022/0377615 | A1 | 11/2022 | Radunovic |
| 2023/0315534 | A1 | 10/2023 | Asawa |
| 2023/0325266 | A1 | 10/2023 | Yang |
| 2023/0409362 | A1* | 12/2023 | Shevade ................... G06F 8/65 |
| 2023/0409363 | A1 | 12/2023 | Shevade |
| 2023/0412507 | A1* | 12/2023 | Shevade ............... G06F 9/5088 |
| 2024/0040002 | A1 | 2/2024 | Krasilnikov et al. |
| 2024/0089846 | A1* | 3/2024 | Munoz-Sanchez ... H04W 48/18 |
| 2024/0196178 | A1 | 6/2024 | Ying |
| 2024/0202153 | A1 | 6/2024 | Huang |
| 2024/0202157 | A1 | 6/2024 | Paterra |
| 2024/0205680 | A1 | 6/2024 | Paterra |
| 2024/0236178 | A1 | 7/2024 | Gupta et al. |

OTHER PUBLICATIONS

U.S. Appl. No. 17/548,391, filed Dec. 10, 2021, Ammar Latif et al.
U.S. Appl. No. 17/807,341, filed Jun. 16, 2022, Upendra Bhalchandra Shevade et al.
U.S. Appl. No. 17/807,343, filed Jun. 16, 2022, Upendra Bhalchandra Shevade et al.
U.S. Appl. No. 17/807,344, filed Jun. 16, 2022, Upendra Bhalchandra Shevade et al.
U.S. Appl. No. 17/808,518, filed Jun. 23, 2022, Ozgur Dural.
U.S. Appl. No. 17/326,221, filed May 20, 2021, Ximeng Simon Yang.
U.S. Appl. No. 17/461,785, filed Aug. 30, 2021, Diwakar Gupta.
U.S. Appl. No. 17/710,571, filed Mar. 31, 2022, Manjari Asawa.
U.S. Appl. No. 17/806,684, filed Jun. 13, 2022, Benjamin Wojtowicz.
U.S. Appl. No. 17/806,685, filed Jun. 13, 2022, Benjamin Wojtowicz.
U.S. Appl. No. 17/810,319, filed Jun. 30, 2022, Julius Mueller, at al.
U.S. Appl. No. 17/809,864, filed Jun. 29, 2022, Nikolay Kirschenmann, et al.
U.S. Appl. No. 17/820,542, filed Aug. 17, 2022, Nikolay Kirschenmann, et al.
Unknown, "5G; NG-RAN; Architecture Description", Technical Specification, ETSI TS 138 401, Version 16.8.0, Release 16, Jan. 2022, pp. 1-82.
Ashfaq Ahmed, et al., "Hybrid Automatic Repeat Request (HARQ) in Wireless Communication Systems and Standards: A Contemporary Survey", IEEE Communications Surveys & Tutorials 23.4, 2021, pp. 2711-2752.
U.S. Appl. No. 17/326,218, filed May 5, 2021, Ximeng Simon Yang.
U.S. Appl. No. 17/364,779, filed Jun. 30, 2021, Diwakar Gupta et al.
U.S. Appl. No. 17/364,788, filed Jun. 30, 2021, Diwakar Gupta et al.
U.S. Appl. No. 17/364,791, filed Jun. 30, 2021, Diwakar Gupta et al.
U.S. Appl. No. 18/146,126, filed Dec. 23, 2022, Diwakar Gupta et al.
U.S. Appl. No. 18/066,650, filed Dec. 16, 2022, Jiandong Huang et al.
U.S. Appl. No. 18/067,654, filed Dec. 16, 2022, Frank Paterra et al.
U.S. Appl. No. 18/067,651, filed Dec. 16, 2022, Frank Paterra.
Li Xin et al: "QoS-Aware Service Selection in Geographically Distributed Clouds", 2013 22nd International Conference on Computer Communication and Networks (ICCCN), IEEE, Jul. 30, 2013, pp. 1-5 [retrieved on Sep. 27, 2013].

\* cited by examiner

CLOUD-MANAGED MOBILE PRIVATE NETWORK IMPLEMENTATION SERVERS EXECUTING MULTIPLE LAYERS OF RADIO-BASED TECHNOLOGY STACKS

BACKGROUND

Several generations of broadband cellular communication technologies have been deployed in recent years. 5G is the fifth-generation technology standard for broadband cellular networks, which is gradually taking the place of the fourth-generation (4G) standard of Long-Term Evolution (LTE). 5G technology offers greatly increased bandwidth, thereby broadening the cellular market beyond smartphones to provide last-mile connectivity to desktops, set-top boxes, laptops, Internet of Things (IoT) devices, and so on. Some 5G cells employ frequency spectrum similar to that of 4G, while other 5G cells may employ frequency spectrum in the millimeter wave band. Cells in the millimeter wave band may have a relatively small coverage area but may offer much higher throughput than 4G. As 5G technology becomes more prevalent, new types of broadband-based applications are likely to be developed and deployed.

Figure 1:
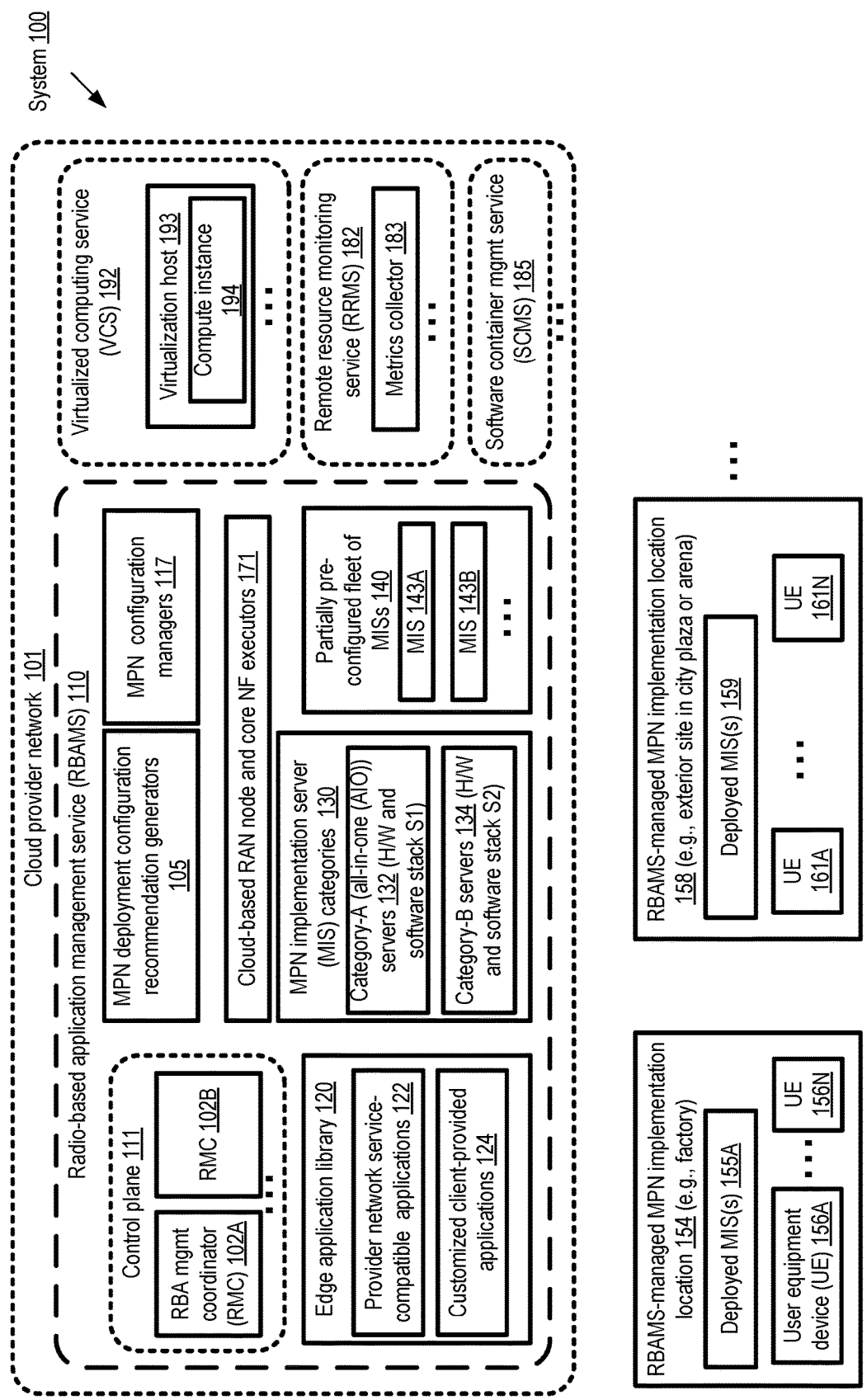
FIG. 1 illustrates an example system environment in which simplified deployment of mobile private networks (MPNs) at locations external to data centers of a cloud provider network may be enabled using servers configured by a network-accessible service of the cloud provider network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for enabling simplified deployment of mobile private networks (MPNs) which implement 5G (fifth generation) or other radio-based technology stacks. MPNs are dedicated business networks, typically set up and used on behalf of a particular organization or entity, that use licensed, shared, or unlicensed wireless spectrum and cellular infrastructure to transmit voice and data to and from devices such as smart phones, Internet-of-Things (IoT) devices, embedded modules, and the like. MPNs are referred to as "non-public networks" by 3GPP (3rd Generation Partnership Project), a mobile telecommunications standards organization. The term "radio-based application" (RBA) is used herein to refer to applications in which at least some messages are transmitted using radio frequency signals and associated antennas, such as those used for various generations (4G, 5G and the like) of cellular broadband technologies; an MPN is thus one example of an RBA. An MPN can also be referred to as a private cellular network.

In one example of the simplification of the deployment of MPNs achieved using the techniques described herein, a single server (referred to as an all-in-one (AIO) MPN implementation server) configured by and obtained from a cloud provider network service can be utilized at a location external to the cloud provider network to implement several of the layers of the radio-based technology stack, such as all the layers of a 5G radio access network (RAN) node as well as portions of the 5G core network layer. The layers of the RAN node implemented at the AIO MPN implementation server (MIS) can include a radio unit (RU), a distributed unit (DU) and a centralized unit (CU). Conventionally, for many RBAs, the RU (which can include analog-to-digital conversion logic and a high-speed optical link) is typically implemented using a separate device or devices than those used for the DU network functions, and the CU and core network functions are often implemented using additional devices. The portions of the 5G core network layer implemented at the AIO MIS can include the UPF (User Plane Function). In addition to various layers of the radio-based technology stack itself, an AIO MIS can also be used to run a suite of data processing applications (referred to as edge applications) locally, e.g., to process or analyze sensor data or other contents of data payloads of the messages being transmitted via the MPN. The term "all-in-one" is used to refer to the servers because, for at least some types of MPNs, only a single such server is required for implementing multiple MPN stack layers and associated data processing applications at the location external to the cloud provider network, in contrast to alternative approaches in which some layers of the stack are implemented at respective servers. The amount of configuration effort required from the entity or organization on whose behalf the MPN is established is thus substantially reduced in comparison to scenarios in which multiple servers or devices have to be configured separately and connected to each other at the targeted MPN location.

An AIO MIS can include a pluggable hardware card at which network functions of one or more layers of the stack are run using specialized chip sets, as well as primary or general-purpose processors at which other network functions and/or selected edge applications that can be used to process data payloads of the MPN messages are run. A pluggable card can itself include several kinds of circuitry usable for MPNs, such as chip sets for implementing RU and some DU network functions, as well as auxiliary processors which can be used for other network functions or other tasks if desired. A network function is a functional building block within a network infrastructure, which has well-defined external interfaces and a well-defined functional behavior. Network functions can be chained together in pipelines to form various kinds of radio-based applications, including MPNs. Network functions have historically been implemented as a physical network appliance or node; however network functions can be virtualized as well. Some MISs provided by the cloud provider network can implement a different combination of layers of radio-based technology stack than others, with the specific MPN implementation servers being selected depending on the requirements of the clients on whose behalf the servers are to be deployed.

The cloud provider network service, referred to as a radio-based application management service (RBAMS), can perform several different types of tasks associated with setting up and using MPNs. For example, the RBAMS can plan MPN deployments for clients (e.g., providing recommended numbers and recommended physical placement of MISs for a given use case indicated by a client), ship partially pre-configured MISs to desired locations, orchestrate lower-level configuration steps needed to complete configuration of the MPNs at the desired locations, verify connectivity between the MISs and monitoring services of the cloud provider network, and provide simplified tools to enable the client on whose behalf the MPN is established to view the status of the MPN and initiate configuration changes if desired. Several different categories of MISs can be provided by the RBAMS, differing from one another in the computing capacity, memory and storage capacity, networking bandwidth, the type or vendor of specialized hardware components such as systems-on-chip (SOCs) used for network functions, and/or other properties. Clients of the RBAMs can request custom combinations of data processing applications (as opposed to the radio-based communication stack implementation applications such as RAN network functions or core network functions) to be installed on the MISs (e.g., IoT device management applications, IoT data processing applications, machine learning applications and the like). At least some of these applications can implement application programming interfaces (APIs) compatible with one or more services of the cloud provider network (such as a machine learning service or an IoT device management service), and implement at least a subset of the functionality of such services while running in a local mode at an MIS. If desired, a client can install (and/or request the RBAMS to install) their own custom data processing applications on the MISs.

A monitoring service of the provider network can provide a unified management console or graphical user interface for managing not just the MISs, but other provider network resources being used by RBAMS clients if desired, such as compute instances of a virtualized computing service, cloud storage devices, cloud-based databases, and the like. Note that even though MISs provided by an RBAMS can be configured such that only a single MIS is needed at a particular location, a client can use multiple MISs at that location for the MPN if desired. Such multi-MIS configurations may be used, for example, to achieve desired levels of availability, to handle traffic of end-user devices that are distributed across greater distances than can be handled by a single MIS, and/or for other reasons. The RBAMS can configure multiple interconnected MISs for such use cases at the request of the client.

As one skilled in the art will appreciate in light of this disclosure, certain embodiments may be capable of achieving various advantages, including some or all of the following: (a) reducing the number of computing resources or devices required for implementing MPNs at locations selected by clients of a cloud provider network, (b) improving the user experience of administrators of MPNs by simplifying the management and administration of the MPNs using provider network tools and interfaces, and/or (c) increasing the speed with which MPNs can be deployed and configured, enabling new kinds of radio-based applications to be brought online quickly.

According to some embodiments, a system may include one or more radio-based application management coordinators (RMCs) of a cloud provider network service such as an RBAMS, and a plurality of MPN implementation servers (MISs). Individual ones of the MISs, referred to as all-in-one or AIO MISs, may comprise a respective set of primary processors (e.g., CPUs) as well as a pluggable hardware card which includes a set of chips or circuitry for executing at least a portion of an RU of a RAN node of a radio-based technology stack and a portion of the DU of the RAN node. In some cases, the set of chips may include one or more systems-on-chip (SOCs). The pluggable card may be linked to the primary processors of the MIS using a peripheral interconnect such as PCIe (Peripheral Component Interconnect—Express), USB (universal serial bus) or the like in different embodiments. The RMCs may run at data centers of the cloud provider network, while the MISs may be intended for deployment at locations external to the cloud provider network. In at least some embodiments, the plurality of MISs may include some MISs designed to implement fewer layers of the technology stack than are implemented at the AIO MISs; the remaining layers for such MISs may be run at other servers, either at cloud provider network data centers or at premises external to the data centers of the cloud provider network.

A particular RMC may receive, e.g., from a client of the cloud provider network via a programmatic interface, an MPN requirement descriptor comprising (for example) a set of performance requirements of an MPN to be implemented at least in part at a location external to the data centers of the cloud provider network. In various embodiments, based on analysis of the requirements, the RMC may transmit a recommended deployment configuration to the client for implementing at least a portion of the MPN at that location. The recommended deployment configuration may comprise an AIO MIS in some embodiments. In some recommended deployment configurations, at least a portion of a user plane function (UPF) layer of a core network associated with the RAN node of the AIO MIS may also be executed at the AIO MIS. In some embodiments, the UPF functionality may be implemented using the general-purpose processors of the AIO MIS; in other embodiments, the UPF functionality may be implemented (e.g., using auxiliary processors) at the hardware card at which the RU and DU network functions are run. In at least some embodiments, functions of the CU of the RAN node may also be run at the AIO MIS, e.g., at the hardware card or at the general-purpose processors.

The recommended deployment configuration may be provided to the client via programmatic interfaces in various embodiments. If the recommended deployment configuration is approved by the client, the AIO MIS may be transported or shipped to the targeted location for the MPN and activated there. The process of activation may comprise a few simple steps in different embodiments, such as powering on the AIO MIS and enabling connectivity to the Internet or to some other network (such as a private network for Internet Protocol (IP) packets, linking the external location to the cloud provider network) which can be used to communicate with the RMC or other resources at the cloud provider network. In some embodiments, the AIO MIS may comprise an embedded antenna for receiving and transmitting radio signals, and/or an embedded Wi-Fi antenna. In other embodiments, an external radio antenna may be attached to the AIO MIS as part of the activation procedure. After the AIO MIS has been activated at the targeted location, the RMC may verify that connectivity has been established between the AIO MIS and a remote monitoring service of the cloud provider network.

The AIO MIS may begin operations of the MPN after the connectivity verification in various embodiments, such as receiving, processing and transmitting end-user messages of the MPN. A message may be received at the AIO MIS from a user equipment (UE) device of the MPN, for example, and a set of network functions of the MPN may be executed with respect to the message. The set of network functions may include RU and DU network functions executed at the pluggable card, as well as CU and UPF layer functions. In embodiments in which the UPF is implemented at the AIO MIS, user data payloads contained in the UE messages may not have to be transmitted to the cloud provider network data centers, thereby reducing the amount of traffic required between the MPN location and the cloud provider network substantially compared to scenarios in which the UPF is implemented at the cloud provider network data centers. In at least some embodiments, the AIO MIS may have several user data processing applications installed locally, and such applications may be run at the AIO MIS as needed. Such user data processing applications may be referred to as edge applications, as opposed to cloud data center-based applications, as they may provide similar functionality to cloud-based services (such as machine learning services, IoT device management services and the like) and implement the same APIs as cloud-based services, but may be run at the MIS without requiring transfer of the processed data to/from the data centers. In at least some embodiments, a set of such applications may be installed at the AIO MIS at the cloud provider network before the AIO MIS is transported to the MPN target location.

In various embodiments, the RCMs may generate different customized deployment recommendations for respective MPN use cases, depending for example on the requirements indicated in the MPN descriptors provided by clients. The customized deployment recommendations may differ from one another in various parameters, such as the aggregate performance capacity of a set of primary processors of a recommended MIS, memory size of the MIS, or the particular set of hardware cards incorporated within the MIS (which can be used to execute one or more network functions). Some clients may provide a very high-level requirements descriptor, comprising general statements regarding the intended use of the MPN (e.g., "My MPN is to be used for communication with a set of robots in a factory"), while other clients may provide more detailed requirements (e.g., including the radio frequency ranges to be used, the numbers and kinds of UE devices expected (e.g., cell phones, IoT devices, sensors, and the like), the physical dimensions of the building within which the MPN is to be set up or the outdoor are within which the MPN is to be set up, redundancy/availability requirements, anticipated message rates and sizes, message processing latency requirements, power availability, ambient temperature ranges, data processing edge application requirements, monitoring requirements, the target budget/cost range of the MPN from the client's perspective, etc.) In scenarios in which a client provides only high-level information, the RCM may select a preconfigured MIS from a set of supported MIS classes of an RBAMS for inclusion in the recommended deployment configuration. If a client provides detailed requirements, and the RCM determines that the default configuration of a supported MIS may need to be modified for the detailed requirements to be satisfied, a description of a customized version of the supported MIS may be included in the recommended deployment configuration, in which various modifications needed to the default configuration are indicated. If the proposed customized version is approved and requested by the client, the needed modifications may be applied at the cloud provider network (e.g., as a result of a configuration request generated by the RCM and transmitted to a server configuration team) to customize the MIS before the MIS is sent to the MPN implementation location in various embodiments.

In some embodiments, a given recommended MPN deployment configuration generated and provided by an RCM may include several MISs, e.g., intended to be located at various spots within a large factory or building. In one embodiment, a pluggable card of an MIS may include a hardware accelerator optimized for one or more types of network functions, thereby enabling lower latencies for MPN message processing than if those network functions were to be executed at general-purpose processors. In some embodiments, an MIS may comprise multiple pluggable hardware cards, with individual ones of the cards being employed for respective types of network functions and/or edge applications.

A variety of metrics may be collected by the monitoring service of the cloud provider network from the MISs, such as message rates from various kinds of UE devices, the number of network function executions at various layers of the radio-based technology stack, error rates, rates of non-radio network traffic (e.g., to other devices at the location) of the MISs, utilization levels of the primary processors as well as chips/processors of the pluggable card, and so on. Such metrics may be provided via programmatic interfaces to the clients on whose behalf the MPNs are set up. In some embodiments, a secure network channel, such as a virtual private network (VPN) tunnel or VPN connection, may be established between an MIS at an MPN target location and resources located within the provider network data centers. Such a channel may be employed, for example, for sending administrative commands or configuration changes from the provider network to the MIS, and/or collecting monitoring data from the MIS. In at least some embodiments, a unified administrative tool (such as a web-based console) may be made available to the client on whose behalf an MIS is configured, enabling status monitoring and configuration changes to be performed by the client with respect to not just the MIS used for an MPN, but also with respect to other cloud-managed resources (such as compute instances of a virtualized computing service or VCS) assigned/allocated to the client.

An MIS may, in various embodiments, serve as a source or destination of several different types of IP traffic, including traffic between different layers of a radio-based technology stack, traffic to and from other resources in client networks established at the MPN locations, traffic to and from the public Internet, and so on. A given MIS may be equipped with several different kinds of networking hardware devices (NHDs) that can be employed for the IP traffic, including for example default network interface cards, networking chipsets within pluggable cards, and so on. Network management logic provided by the provider network can be used to intelligently select the most appropriate NHD to be used for a given category of IP traffic of an MIS during a given time interval, thus enabling the best use of the available IP networking resources of the MIS to achieve quality of service targets of the MPNs. In some embodiments, servers configured by an RBAMS, at which multiple layers of radio-based technology stack are run as described above, may be used to implement RBAs other than MPNs; the benefits of co-locating or consolidating multiple layers of the stack within a single server are not limited to MPNs as such. Thus, MISs may be considered one example of multi-layer radio-based application implementation servers which can be provided by an RBAMS. An MIS used to run a 5G MPN may be referred to as a smart 5G access point in some embodiments. In some embodiments, all-in-one servers of the kind introduced herein may be employed for cellular networks that are not necessarily private—for example, for some use cases, public networks (cellular networks which are intended for use by the general public) may be set up using similar all-in-one servers in configurations recommended by an RBAMS based on client-specified requirements.

As mentioned above, MPNs and other RBAs may be configured at least in part using resources of a provider network in some embodiments. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters its primary data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, or a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network or as an extension resource group of a VCS (virtualized computing service) of the provider network. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices, antennas or other telecommunication equipment, and/or workloads.

As mentioned above, some cloud provider networks may provide support for local zones, a type of infrastructure deployment that places some of the provider network's compute, storage, database, and other select services close to large population, industry, and IT centers or other desired locations which may not be very near the provider network's primary data centers. With such local zones, applications that need single-digit millisecond latency can be run closer to end-users in a specific geography. Local zones provide a high-bandwidth, secure connection between local workloads and those running in a provider network region, allowing provider network clients to seamlessly connect to their other workloads running in the region and to the full range of in-region services through the same APIs and tool sets. In some embodiments, at least a portion of an MPN may be implemented using provider network resources deployed at edge locations and/or local zones.

The cloud provider network may implement various computing resources or services, which may include a VCS, a radio-based application management service (RBAMS), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers of the provider network in different embodiments. Network-accessible computing services can include an elastic compute cloud service (referred to in various implementations as an elastic compute service, a virtual machines service, a computing cloud service, a compute engine, a VCS or a cloud compute service). This service may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units [CPUs] or CPU cores, hardware accelerators for various tasks), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, a non-burstable or dedicated instance type that is allotted and guaranteed a fixed quantity of resources, or an instance type optimized for radio-based applications). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, MISs used for MPNs may run one or more compute instances, which may be used to execute edge user data processing applications and/or some MPN network functions.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. MPN components may be run using containers at the MISs in at least some embodiments. Other types of network-accessible services, such as packet processing services, database services, wide area networking (WAN) services and the like may also be implemented at the cloud provider network in some embodiments.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information management). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks. In some embodiments, RCMs may be implemented as part of the control plane of an RBAMS.

FIG. 1 illustrates an example system environment in which simplified deployment of mobile private networks (MPNs) at locations external to data centers of a cloud provider network may be enabled using servers configured by a network-accessible service of the cloud provider network, according to at least some embodiments. As shown, system 100 includes resources and artifacts of several network-accessible service of a cloud provider network 101, including an RBAMS 110 and a VCS 192. The control plane 111 of the RBAMS 110 may include a set of radio-based application (RBA) management coordinators (RMCs), such as RMC 102A and RMC 102B, responsible for orchestrating the configuration and deployment of MPNs at locations external to the data centers of the cloud provider network on behalf of RBAMS clients. The clients may utilize programmatic interfaces implemented by the RBAMS to provide requirement descriptors of desired MPNs (e.g., indicating the types of traffic expected at the MPNs, approximate performance requirements of the MPN, etc.) at various target locations in the depicted embodiment. The target locations may include interior locations within buildings, such as factories, office buildings, shopping malls and the like, and/or exterior locations more exposed to the environment, such as a plaza, arena or gathering space of a city.

The descriptors may be obtained initially by an RMC, and analyzed with the help of MPN deployment configuration generators 105 in the depicted embodiment. Based on analysis of a descriptor of a particular MPN, a recommended deployment configuration for the MPN may be generated and provided (e.g., by the RMC) to the client via programmatic interfaces. A recommendation may indicate, for example, one or more MPN implementation servers (MISs) that can be configured and deployed in the target location if the recommendation is approved by the client. In the embodiment depicted in FIG. 1, the RBAMS may be able to recommend and provide an MIS belonging to one of several MIS categories 130, such as Category-A (all-in-one) AIO servers 132 with a hardware and software stack S1, Category-B servers 134 with a different hardware and software stack S2, and so on. For example, category-A servers may include hardware from a first vendor and a particular hypervisor, while category-B servers may include hardware from a second vendor and include a different kind of hypervisor. A particular AIO MIS may for example include a set of general purpose or primary processors (e.g., CPUs) at which compute instances, virtual machines, or software containers can be executed, as well as one or more pluggable hardware cards at which at least a portion of the functionality of an MPN (such as RU and some DU network functions) are run on custom chip sets in some embodiments. In addition to MISs of the pre-defined supported categories, customized MISs may also be configured by the RBAMS and provided to clients in some embodiments; such custom MISs may be obtained my modifying the default MIS category configurations (by adding hardware or software, modifying configuration files setting tuning parameter values etc.) in such embodiments. In at least one embodiment, a partially pre-configured fleet of MISs 140 may be maintained at the RBAMS, including MIS 143A, MIS 143B and the like. In scenarios in which custom configurations are required to meet the client's MPN requirements, a proposed configuration may be indicated in the recommendation, before any MIS configurations are actually modified. If the client approves the recommendation in such scenarios, MISs with the configuration changes may be prepared and transported to the client. The RBAMS may include an edge application library 120 in some embodiments, comprising a variety of applications for processing data payloads of MPN messages which can be executed on MISs locally (e.g., outside the provider network data centers) if desired by RBAMS clients. The edge application library may include a set of provider network service-compatible applications 122 and customized client-provided applications 124 in the depicted embodiment. The provider network service-compatible applications may provide similar functionality to cloud-based services (such as machine learning services, IoT device management services and the like) and implement the same APIs as cloud-based services, but may be run at the MIS without requiring transfer of the processed data to/from the data centers of the provider network. Customized client-provided applications may implement data processing logic designed by clients, and may not necessarily support APIs of provider network services. In at least some embodiments, a set of applications from the edge application library may be installed at an MIS at the cloud provider network before the MIS is transported to the MPN target location.

In the example scenario depicted in FIG. 1, one client of the RBAMS has provided an MPN requirement descriptor for an RBAMS-managed MPN implementation location 154 (e.g., a factory at which the MPN is to be used for communication with various industrial robots or IoT devices), while another client has provided a different MPN requirement descriptor for an RBAMS-managed MPN implementation location 158 (e.g., an exterior site in a city plaza or arena). The RMC has provided respective deployment recommendations for each of the desired MPNs, the clients have approved, and one or more MISs have been transported to the locations. Deployed MIS(s) 155A and/or deployed MIS(s) 159 may each comprise one or more AIO MISs in the depicted scenario (e.g., Category-A servers 132). After a deployment recommendation is approved, the MISs are received at the target locations, and the MISs are activated (e.g., by powering on and connecting to an IP network), in some embodiments the RMC may verify that connectivity has been established between the deployed MISs and one or more metrics collectors 183 of a remote resource monitoring service (RRMS) 182 of the cloud provider network. The monitoring service may collect status and metrics from the deployed MISs in various embodiments, and provide the status and/or metrics to the clients via programmatic interfaces. In some embodiments, to verify connectivity between a deployed MIS and the RRMS, an RMC may transmit a message containing a network address or other identifier of the MIS to the RRMS, requesting a metrics collector to obtain a metric from the MIS and provide the metric to the RMC. If the metrics collector is able to provide the metric successfully, connectivity may be deemed to have been verified. In at least some embodiments, an MPN configuration manager 117 may perform various lower-level configuration tasks pertaining to an MPN set up using one or more MISs at the premises external to the provider network, such as ensuring that the radio-based technology stack components at an MIS are correctly configured to process signals of the frequency ranges indicated by the client, specific network functions selected by the client are being run, and so on.

In various embodiments, the software stack of a deployed MIS may include one or more compute instances (similar to compute instance 194 at virtualization host 193 of VCS 192) at which various applications or network functions which are not implemented at the pluggable hardware cards of the MIS may be executed. In one embodiment, the deployed MIS may include one or more software containers (configured with the help of a software container management service (SCMS) 185 of the cloud provider network 101), and such containers may be used for some applications or network functions.

After connectivity has been established and verified between an activated deployed MIS at the target RBMAS-managed MPN implementation location, processing of messages of the MPN may be initiated at the MIS in the depicted embodiment. Messages from various user equipment devices (UEs) 156A-156N may be processed at the deployed MISs 155A, while messages from UEs 161A-161N may be processed at the deployed MISs 159. The processing of the messages may include the execution of network functions of various layers of the radio-based technology stack (e.g., a 5G stack or a 4G/LTE (4$^{th}$ generation—Long Term Evolution) stack) at the MIS in various embodiments. For example, at a deployed MIS 155A, network functions of the RU and a portion of the DU of the MPN may be executed at the pluggable hardware card, while other network functions of the DU, CU and core network (e.g., including UPF) may be executed using general-purpose processors. In some MISs, network functions of the RU, DU, CU and core network may all be executed at the pluggable card. In at least some embodiments, user data processing applications, such as IoT data management applications, machine learning applications and the like may be run at an MIS to analyze user data payloads of the MPN messages, and the user data may not have to be transmitted to the cloud provider network data centers for analysis. In other embodiments, cloud-based RAN node and core NF (network function) executors 171 at the provider network may be used to implement some of the network functions of the MPN—e.g., results of lower-layer network function executions may be sent to the cloud data centers for analysis by the higher layers. In some embodiments, the cloud-based RAN node and core NF executors may include one or more compute instances 194. In one embodiment, user data of the MPN messages may be transmitted to a compute instance of the VCS, and the user data may be processed/analyzed there.

Figure 2:
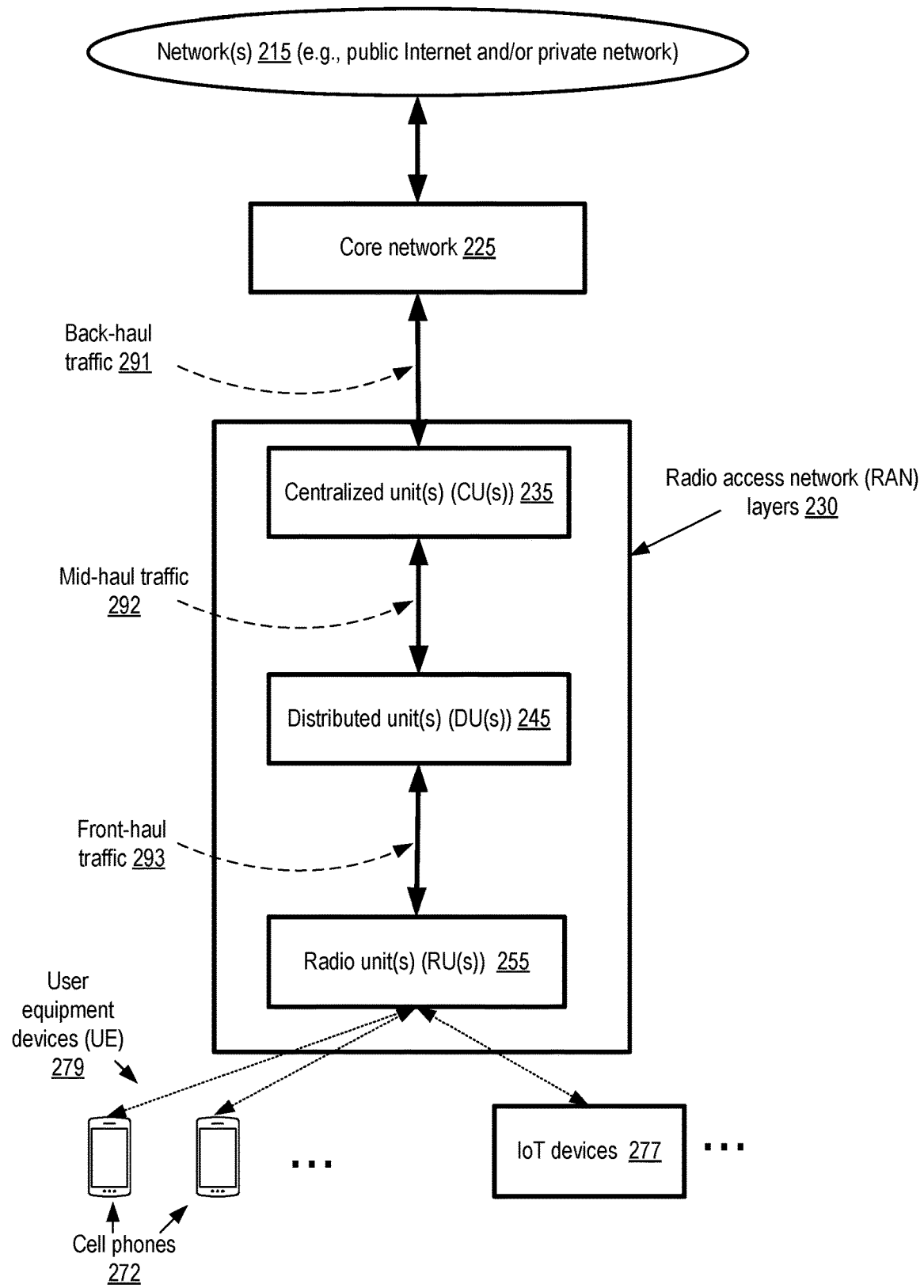
FIG. 2 illustrates an example hierarchy of layers of a radio-based technology stack which may be used for various radio-based applications including MPNs, according to at least some embodiments.

FIG. 2 illustrates an example hierarchy of layers of a radio-based technology stack which may be used for various radio-based applications including MPNs, according to at least some embodiments. In the depicted embodiment, a core network 225 layer of an RBA, linked to one or more networks 215 used to transfer the Internet Protocol packets comprising the payloads and control signals of the RBA over large distances, may implement a set of back-end functions associated with radio-based applications, enabling different sub-networks of the overall system to communicate with one another. Network functions performed at the core network layer (referred to as core network functions) may for example include functions to aggregate data traffic from end user devices, authenticate subscribers, apply personalized policies, and/or manage the mobility of devices prior to routing traffic to operator services or the Internet.

The core network layer may be connected to one or more centralized units (CUs) 235 of a radio access layer (RAN) layer 230. The traffic between the core network layer and the CUs 235 may be referred to as back-haul traffic 291 in the depicted embodiment. A given CU may in turn be connected to one or more distributed unite (DUs) 245 of the RAN layer, and a given DU may be connected to one or more radio units (RUs) 255 of the RAN layer. A combination of one or more CUs, one or more DUs and one or more RUs being used for a given RBA such as an MPN may be referred to collectively as a RAN node in some embodiments. A given RU may receive RBA messages from (and transmit RBA messages to) some number of user equipment (UE) devices 279, such as cell phones 272, IoT devices 277 and the like using radio antennas. The traffic between CUs and DUs may be referred to as mid-haul traffic 292, while the traffic between DUs and RUs may be referred to as front-haul traffic 293.

The mappings between the various RBA layers shown in FIG. 2, and the specific devices or servers at which the layers are implemented for a given RBA, may in general vary. In some embodiments, for example, respective servers or computing devices may be used to implement core network operations, CUs, DUs and RUs. In other embodiments, in which AIO MISs of the kind discussed in the context of FIG. 1 are used, multiple layers (e.g., the RU, DU, CU and at least a portion of the core network) may be implemented at a single server. Within such a single server at which numerous layers of the radio-based technology stack are co-located, different combinations of the layers' functionality may be implemented using general-purpose processors such as CPUs than are implemented using hardware cards which comprise special-purpose chipsets in various embodiments. One of the advantages of co-locating the RU, DU, CU and core network functions on a single server is that very low latencies may be achieved for front-haul, mid-haul, and at least some back-haul messages.

Figure 3:
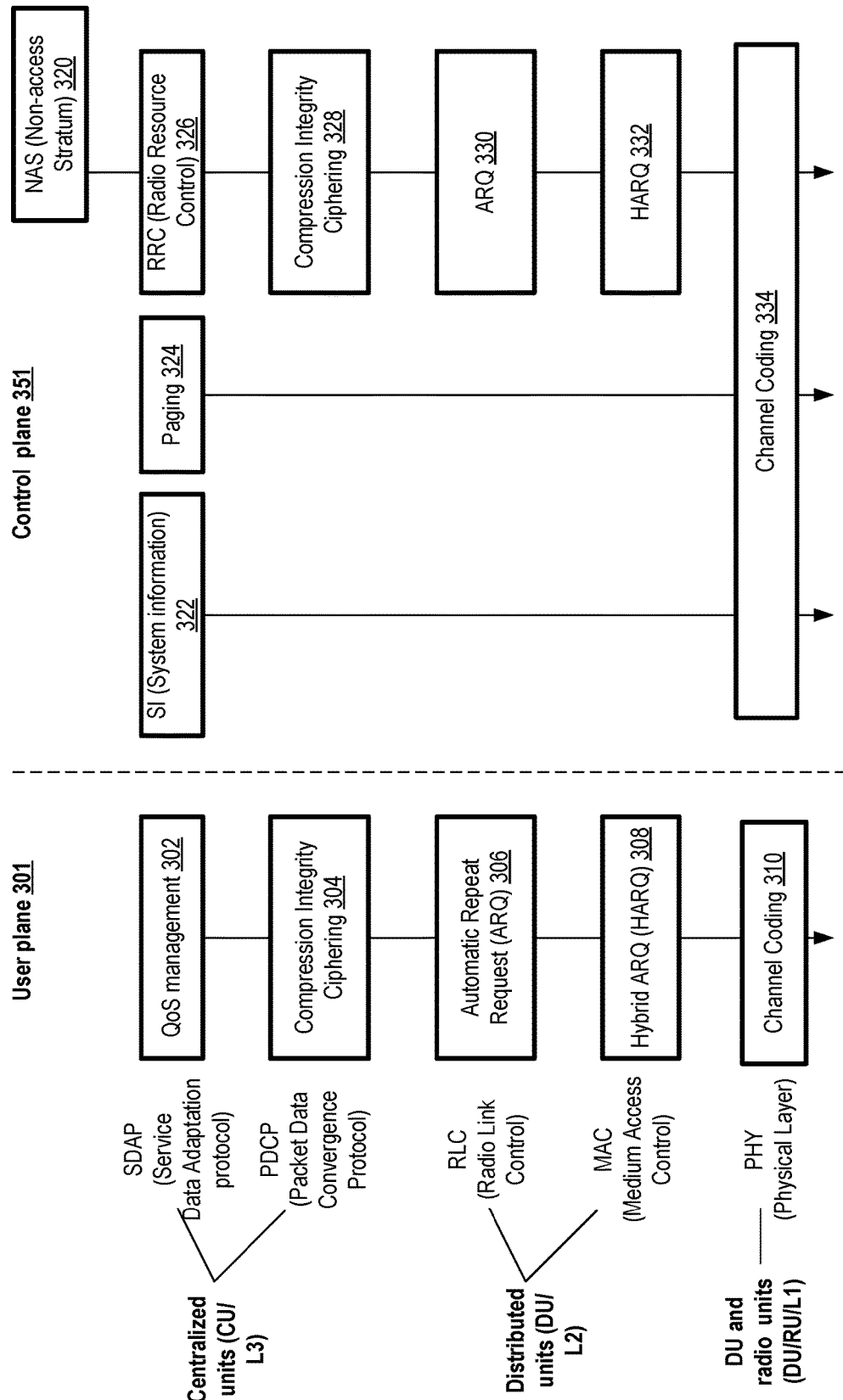
FIG. 3 illustrates an overview of radio access network (RAN) user plane and control plane layers defined in accordance with a radio-based application technology standard, according to at least some embodiments.

FIG. 3 illustrates an overview of radio access network (RAN) user plane and control plane layers defined in accordance with a radio-based application technology standard, according to at least some embodiments. The arrows shown in FIG. 3 represent the downlink communication path (from the higher levels of the standard, sometimes implemented at back-end servers or using general-purpose processors of an MIS, downwards to the lower levels which are implemented using front-end components such as pluggable hardware cards). The depicted layers conform to a 5G-NR (Fifth Generation-New Radio) standard published by 3GPP; similar layers are also defined for other generations of cellular communication technology.

In a manner somewhat analogous to the subdivision, discussed above, of a provider network functionality into control plane and data plane functionality, the operations needed for RBAs are divided into control plane operations and user plane operations. Control plane operations include connection configuration and other administrative tasks such as monitoring, while user plane operations involve transmission of user data using IP packets. Contents of control plane messages may indicate changes to RBA application state, and the state information thus obtained and updated may be used to process user plane messages.

The 5G-NR protocol stack comprises three layers, referred to as L1 (layer 1), L2 (layer 2) and L3 (layer 3). Standardized interfaces for communications between the layers (and between sub-layers of individual layers) have been defined; this allows network functions of the layers and sub-layers to be mapped flexibly to different hardware and/or software components as long as the interfaces and performance requirements of the protocol stack can be met. Logic for executing the functionality of the layers is distributed among three types of components: CUs for L3 operations, DUs for L2 operations and optionally for some L1 operations, and RUs used for at least a subset of L1 operations. L1 is also referred to as the physical layer (PHY). L2 comprises the MAC (Medium Access Control) and RLC (Radio Link Control) sub-layers. L3 may include sub-layers for PDCP (Packet Data Convergence Protocol) and SDAP (Service Data Adaptation Protocol). Operations of user plane 301 may include quality of service (QoS) Management 302 and Compression Integrity Ciphering 304 in L3, Automatic Repeat Request (ARQ) processing 306 and Hybrid ARQ (HARQ) processing 308 in L2, and Channel Coding 310 at the PHY layer. Operations of control plane 351 may include Non-access Stratum (NAS) 320 protocol tasks, System Information (SI) 322 tasks, Paging 324, Radio Resource Control (RRC) 326 and Compression Integrity Ciphering 328 in L3, ARQ 330 and HARQ 332 in L2, and Channel Coding 334 in the PHY layer. Various ones of the layers and protocols shown in FIG. 3 may comprise the execution of respective sets of network functions. In at least some embodiments, a subset of the network functions corresponding to L1, L2 and/or L3 may be implemented using pluggable hardware cards at MISs of the kind introduced above. In at least one embodiment, a subset of the network functions corresponding to L1, L2 and/or L3 may be implemented at compute instances or software containers at MISs.

Figure 4:
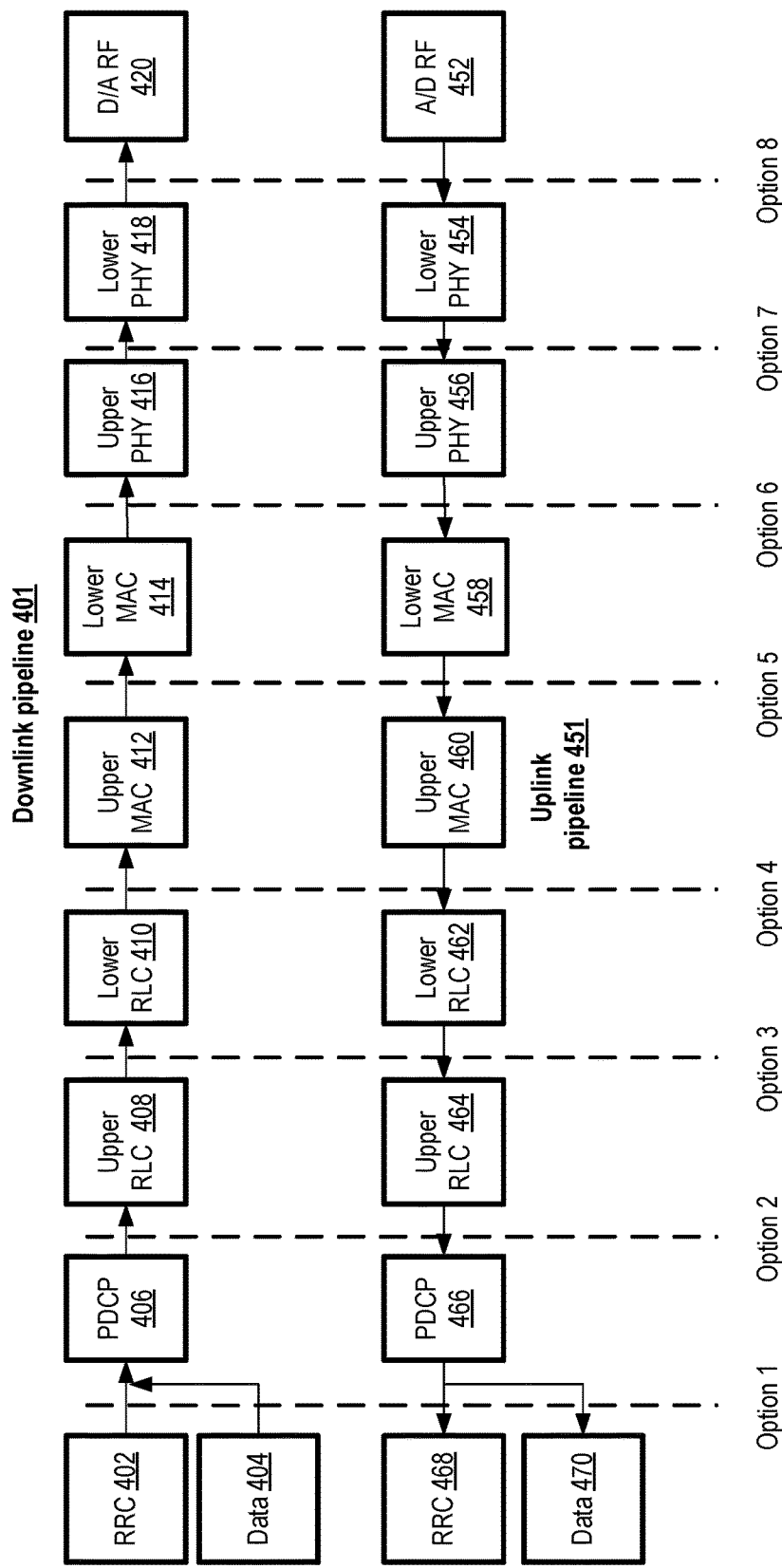
FIG. 4 illustrates example uplink and downlink pipelines of RAN network functions for radio-based applications, according to at least some embodiments.

FIG. 4 illustrates example uplink and downlink pipelines of RAN network functions for radio-based applications, according to at least some embodiments. Standards organizations have define several options for splitting the functions of the pipelines among the CUs and DUs, which are indicated by the dashed line labeled Option 1, Option 2, . . . , Option 8 in FIG. 4. In general, such splits make it possible to distribute the workload for radio-based applications across several different devices. For some MPNs, all the pipeline functions shown in FIG. 4 may be implemented at a given MIS, so a decision as to which particular split should be implemented may not have to be taken (thereby potentially further reducing the effort required to design and deploy MPNs).

The downlink pipeline 401 starts with RRC (Radio Resource Control) 402 and Data 404 and ends with digital to analog radio frequency (D/A RF) operations 420. In between, the downlink pipeline includes, in sequence, respective sets of network functions for PDCP (Packet Data Convergence Protocol) 406, Upper RLC (Radio Link Control) 408, Lower RLC 410, Upper Medium Access Control (MAC) 412, Lower MAC 414, Upper PHY (physical layer) 416, and Lower PHY 418. The uplink pipeline 451 starts with analog-to-digital radio frequency (A/D RF) operations 452, and ends with RRC 468 and Data 470. In between, network functions are executed in sequence for Lower PHY 454, Upper PHY 456, Lower MAC 458, Upper MAC 460, Lower RLC 462, Upper RLC 464, and PDCP 466. In various embodiments, at least some network functions of the Upper PHY and/or Lower PHY layers (for uplink and/or downlink) may be implemented for MPNs using pluggable cards of the kind discussed above. In some embodiments, network functions of other layers shown in FIG. 4 may also be implemented at the pluggable cards. In at least some embodiments, network functions of the RLC and MAC layers may be implemented using software running within software containers and/or compute instances at the MISs.

Figure 5:
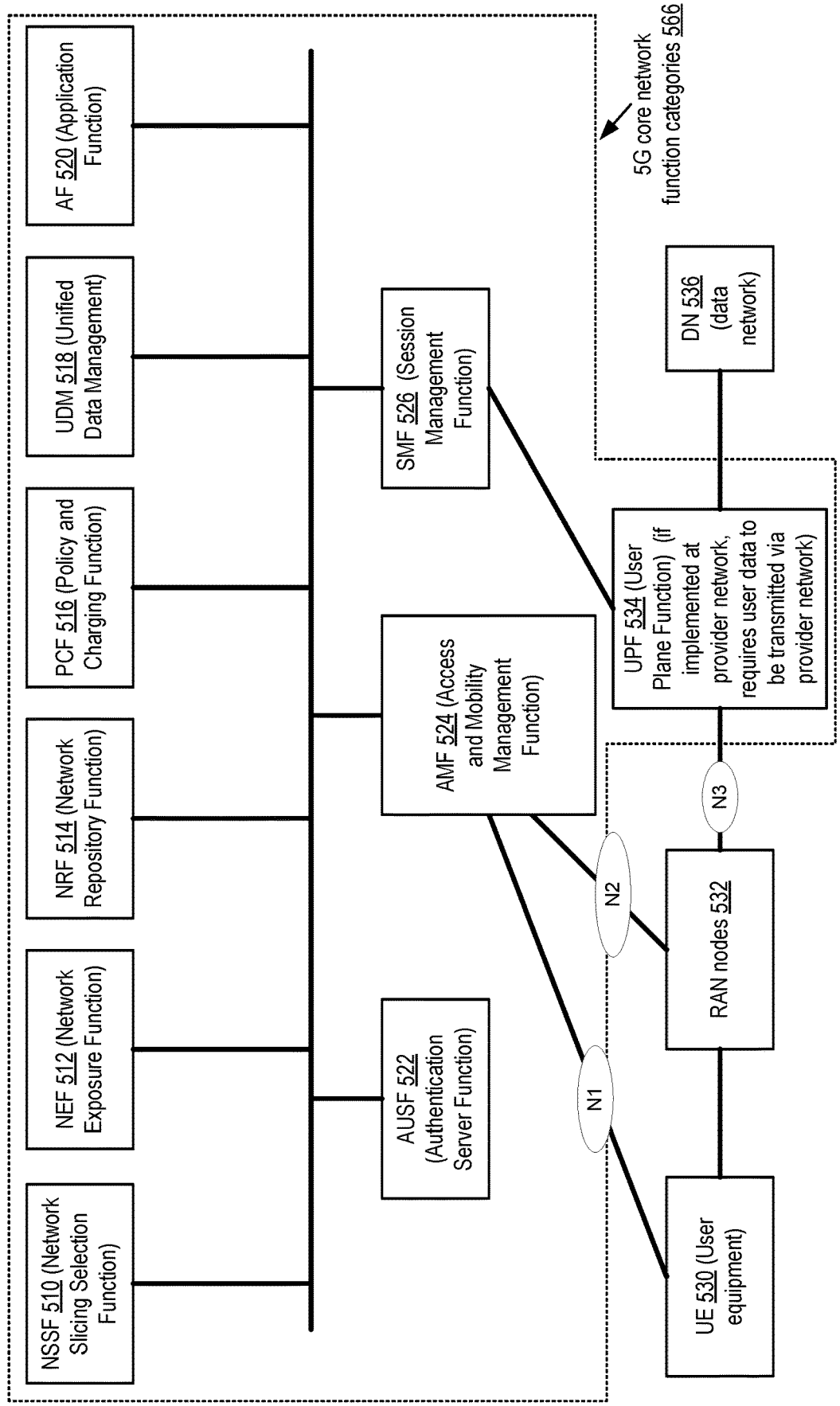
FIG. 5 illustrates example network functions which may be performed at a core network layer of a radio-based technology stack, according to at least some embodiments.

FIG. 5 illustrates example network functions which may be performed at a core network layer of a radio-based technology stack, according to at least some embodiments. The components shown in FIG. 5 correspond to a reference architecture for a version of a 3GPP 5G system released by ETSI (the European Telecommunications Standards Institute). Note that the techniques for simplified MPN deployment introduced in this document may be used with other architectures and other combinations of network functions, and is not restricted to the particular architectures and layers shown in FIG. 2, FIG. 3, FIG. 4 and FIG. 5.

5G core network function categories 566 in the depicted embodiment may include AMF 524 (Access and Mobility Management), UPF 534 (User Plane Function), NSSF 510 (Network Slicing Selection Function), NEF 512 (Network Exposure Function), NRF 514 (Network Repository Function), PCF 516 (Policy and Charging Function), UDM 518, AF (Application Function) 520, AUSF 522 (Authentication Server Function) and SMF 526 (Session Management Function). The details of the kinds of operations expected to be performed by the network functions of the different network function categories, and the interfaces to be used for communications between the different categories of core network functions, are provided in 5G-related standards documents. With respect to the communications between RAN nodes 532 and the core network functions, two interfaces are defined in the standard: an interface referred to as N2 for control plane messages, and an interface referred to as N3 for user plane messages.

Control plane messages from a RAN node (e.g., from a CU of the RAN node) that are to be sent to the core network may be sent via the N2 interface to an AMF 524 in the depicted embodiment. Depending on the kind of control plane message, the AMF may then initiate various operations, which in some cases may involve intra-core-network messages between the AMF and other core network functions. The AMF may also send control plane message responses to the RAN node via the N2 interface. An AMF thus serves as a core network control plane access endpoint in at least some embodiments. In at least some implementations, control plane messages from user equipment (UE) 530 (such as cell phones, IoT devices, etc.), which can be transmitted to AMFs directly via an interface referred to as N1, may instead be sent to RAN nodes and from the RAN nodes to the AMFs using the N2 interface.

User plane messages from a RAN node 532 that are to be sent to the core network may be sent via the N3 interface to a UPF 534 in the depicted embodiment. At least in some cases, the contents of the user plane messages may originate at user equipment (UE) 530, and may have to be sent to some destination via a data network (DN) 536. The DN may for example comprise portions of a public network (such as the public Internet) and/or one or more private networks. The UPF may coordinate the transfer of the user plane message contents via the DN 536; responses to the user plane messages may be received by a UPF from the destinations and passed on to the UEs 530 via the RAN node. A UPF thus serves as a core network user plane access endpoint in at least some embodiments.

In embodiments in which the UPF for a given RBA such as an MPN is implemented at one or more servers of a data center of a provider network, user data received in the payloads of UE messages may have to be transmitted to the data center. Depending on the number of UE devices utilizing the RBA and the workload levels of the RBA, substantial network bandwidth may be required for transmitting the user data, and non-trivial latencies may be added to the MPN message processing pipeline. In contrast, in embodiments in which the UPF is implemented at an MIS deployed at an MPN location outside the provider network, bandwidth requirements for traffic between the MPN location and the provider network may be much lower, and latencies may also be much lower. In some embodiments, one or more categories of core network functions other than UPF may also be implemented at the MISs deployed at MPN locations. Note that in some scenarios in which UPF logic is implemented at an MIS at the MPN location, while other core network functions are implemented at the provider network, substantial performance and bandwidth reduction benefits may be achieved because of the volume of data that has to be processed using UPF logic relative to the processing required from the other core network functions. As such, implementing UPF logic at an MPN location, while still implementing other core network functions at the cloud, may represent a reasonable implementation choice for at least some MPNs managed with the help of provider network services. In at least some embodiments, while the UPF for a given MPN may be executed at an MIS (which has a pluggable card for implementing at least some RU and DU network functions) configured at a location external to the cloud provider network with the help of an RBAMS, one or more of the other network functions shown in FIG. 5 may be implemented at servers other than the MIS—e.g., at servers located in the cloud provider network's data centers, or at servers located at the external location.

Figure 6:
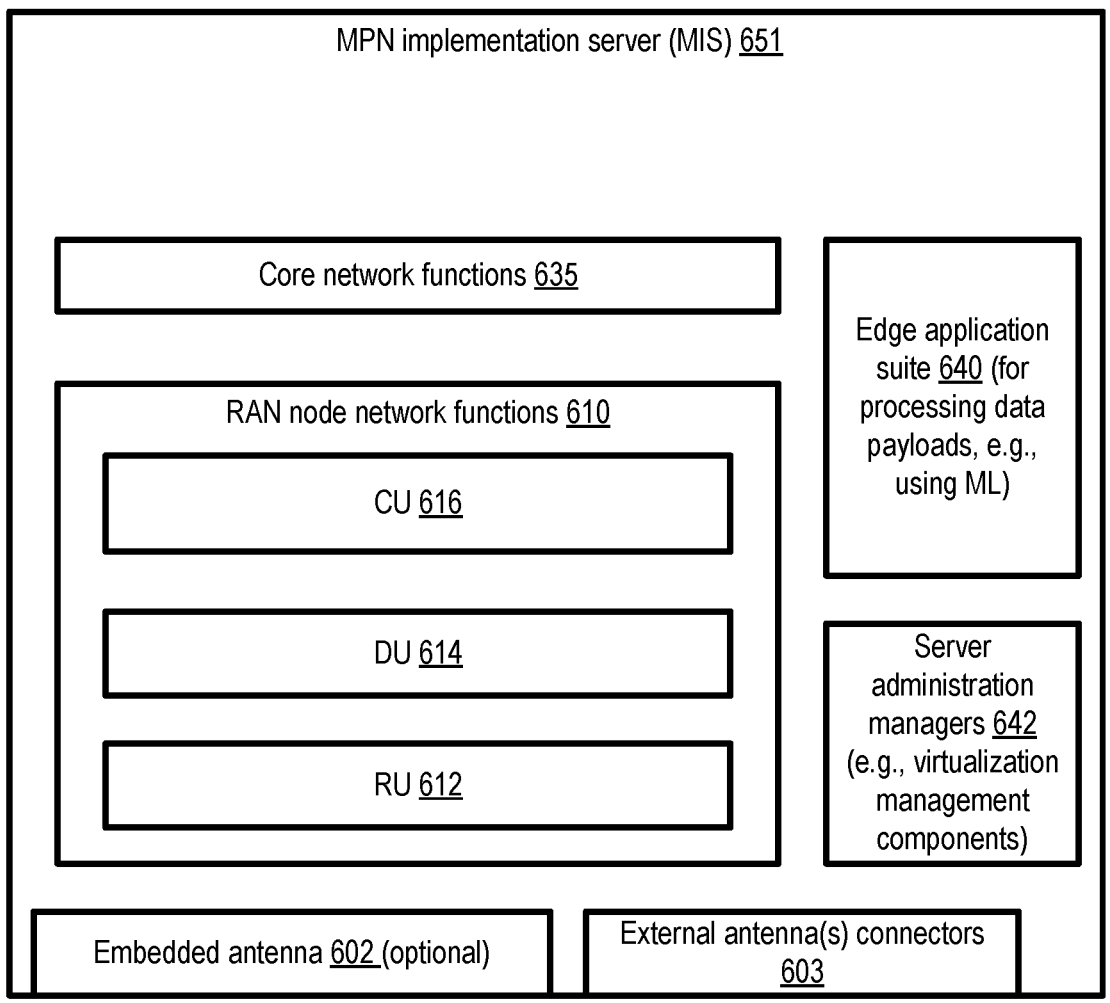
FIG. 6 illustrates example logical subcomponents of an all-in-one MPN implementation server, according to at least some embodiments.

FIG. 6 illustrates example logical subcomponents of an all-in-one MPN implementation server, according to at least some embodiments. In the scenario shown in FIG. 6, an MIS 651 may comprise a set of server administration managers 642 and an edge application suite 640 in addition to various layers of a radio-based technology stack. The layers of the radio-based technology stack may include one or more categories of core network functions 635, RAN node network functions 610 including network functions of a CU 616, a DU 614 and an RU 612.

The server administration managers 642 may for example include virtualization management components such as a hypervisor which can be utilized to implement compute instances or virtual machines at the MIS, networking managers responsible for participating in the establishment of connectivity between the MIS and various external endpoints (including, for example, RMCs and remote monitoring service components at the data centers of the cloud provider network, compute instances set up on behalf of the client at the data centers and used for other applications of the client's choice, local client-owned or client-managed servers at the MPN location, etc.), and so on.

In various embodiments, edge application suite 640 may include a number of applications that implement functionality similar to that provided by various network-accessible services of the provider network, such as machine learning services, video and image analysis services, IoT device management services, sensor data analysis services, and the like. In effect, the edge application suite may enable at least some analysis of user data of MPN messages to be performed locally at the MIS at the target MPN location selected by the client, without having to transmit the data for analysis to the cloud provider network or any other destination. In some embodiments, depending on the MPN functionality and performance desired by the client, some phases of the analysis of user data may be performed at the MIS using the edge application suite, while other phases of the analysis may be performed using resources of the provider network services at data centers. For example, in one implementation, some steps of analysis may be performed on contents of each UE message received at the MIS, while higher-level analysis of the results of those steps may be performed in batch mode at the data centers. In some embodiments, at least some of the same APIs that are supported by a provider network based service may also be supported by a local application included in the edge application suite. For example, consider a scenario in which an API API1 may be usable to submit a set of user data for inference using a trained model stored at a machine learning service (MLS) of the provider network. In such a scenario, a local machine learning application (MLA) included in the edge application suite 640 may support API1 as well, so that inference can be performed locally at the MIS if desired. Because of the API compatibility maintained between the local edge applications and the corresponding provider network services in some embodiments, the client on whose behalf the MPN is implemented may be able to switch seamlessly between local analysis of user data, and provider network-based analysis if desired. In some embodiments, a default set of commonly used edge applications may be installed at an MIS prior to shipment of the MIS to an MPN implementation location. In at least some embodiments, a client may request specific edge applications that are to be included in the suite (or excluded from the suite), and the RBAMS may ensure that the appropriate set of applications is included in the MIS. In various embodiments, a client may install their own data processing applications (e.g., applications that are designed and developed by the client, and need not necessarily support cloud provider network service APIs) on an MIS after it is shipped to the targeted MPN location. In one embodiment, a client may request the RBAMS to install one or more such custom applications on MISs prior to shipment of the MISs to the targeted external locations where the MPNs are run.

In some embodiments, an MIS 610 may include an embedded antenna 602 for messages in the radio frequency ranges of an MPN which uses the MIS. The antenna may be embedded on a pluggable hardware card at which RU network functions are run in some implementations. In one embodiment, an MIS may include an embedded Wi-Fi antenna, e.g., in addition to or instead of an antenna for radio-based communication. An MIS may include one or more external antenna connectors 603 in various embodiments, which can be used to attach radio frequency antennas, Wi-Fi antennas, and/or other kinds of antennas if desired. In some embodiments, an MIS may include only embedded antennas, and connectors for external antennas may not be provided. In other embodiments, only connectors for external antennas may be provided, and embedded antennas may not be included in the MIS.

Figure 7:
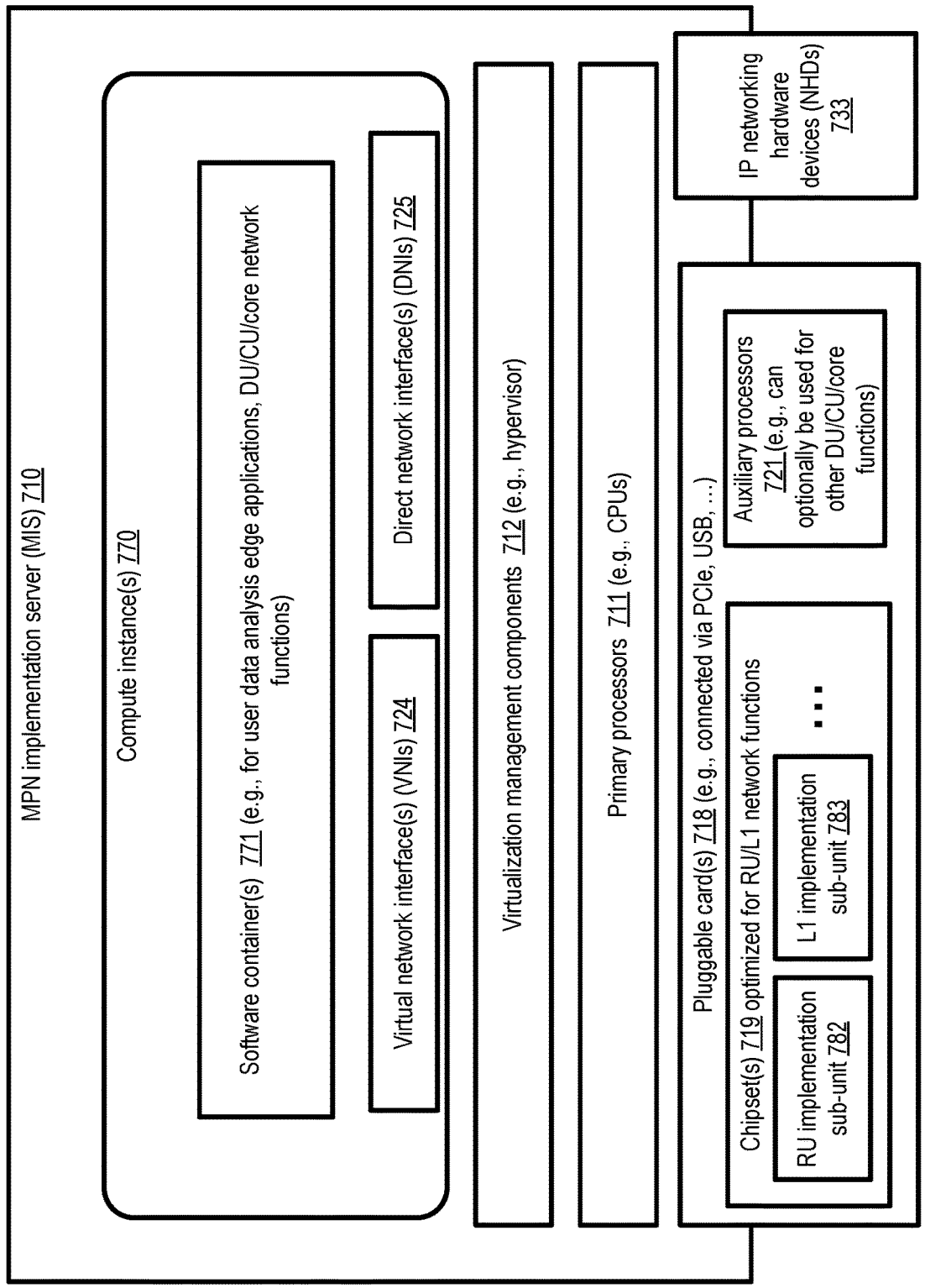
FIG. 7 illustrates an example MPN implementation server which includes a pluggable card for executing network functions, according to at least some embodiments.

FIG. 7 illustrates an example MPN implementation server which includes a pluggable card for executing network functions, according to at least some embodiments. MIS 710 includes a set of primary processors 711 (e.g., CPUs), and at least one pluggable card 718 connected via a peripheral interconnect such as PCIe, USB or the like to the primary processors. The term "pluggable" is used to describe such cards because they can be easily attached or detached from the MIS. For example, a pluggable card implementing one set of network functions can be replaced fairly quickly by a different pluggable card capable of implementing a different set of network functions, using a different optimization technique to accelerate the execution of the same network functions, and/or providing a different performance level for execution of the same network functions.

In the embodiment shown in FIG. 7, a given pluggable card 718 may include one or more chipsets 719 optimized for performing RU and L1 network functions of a RAN node. Respective sets of chips or circuitry may be used for an RU implementation sub-unit 782 and for an L1 implementation sub-unit 783 in some embodiments. In the depicted embodiment, a given pluggable card may include one or more auxiliary processors 721, which may if desired be used for other DU, CU, or core network functions and/or for edge applications. In some embodiments, an MIS may include multiple pluggable cards, each utilized for a respective set of network functions or edge applications. In various embodiments, the MIS may include one or more IP networking hardware devices (NHDs) 733 for IP message traffic (e.g., for communication with RMCs running at data centers of the cloud provider network, and/or for communication with other devices at the location at which the MIS is deployed).

In at least some embodiments, an MIS may be used to run one or more compute instances 770 (e.g., virtual machines) of a VCS of the cloud provider network. A given compute instance 770 may use virtualized versions of primary processors 711 (referred to as virtual CPUs or vCPUs) to implement data analysis edge applications and/or a subset of DU/CU or core network functions of the MPN in some embodiments. The MIS may include virtualization management components 712 (e.g., a hypervisor) which launch the virtual machines of the compute instances, and act as intermediaries between the hardware and the programs run within the virtual machines. In the depicted embodiment, a compute instance may be used to run one or more software containers 771, and the network functions or edge applications may be run within the containers. In various embodiments, depending on the MPN requirements indicated by an RBAMS client, specific subsets of computing resources of an MIS (e.g., chipsets 719, auxiliary processors 721, or primary processors 711) may be chosen for implementing one or more network functions and/or edge applications, and an MIS configured accordingly may be recommended for the MPN by the RBAMS. Respective sets of executable instructions may be stored at the MIS 710, and executed at the primary processors and the auxiliary processors to implement respective sets of network functions or edge application logic in various embodiments.

In at least some embodiments, a compute instance 770 may be configured to use one or more types of network interfaces, such as virtual network interfaces (VNIs) 724 and direct network interfaces (DNIs) 725. A VNI is a virtualized representation of a hardware network interface, enabling some networking-related attributes such as IP addresses to be transferred relatively easily between compute instances without reconfiguring physical network cards. Such attribute transfers may be accomplished, for example, by detaching a VNI programmatically from one compute instance and attaching it programmatically to another compute instance. VNIs also have associated security groups, a set of security rules that can be set up by VCS clients to restrict inbound or outbound traffic to specific endpoints. Messages sent via a VNI may be encapsulated using a protocol of the VCS in some embodiments, which utilizes mappings between VNI IP addresses and physical IP addresses to route the messages. In some embodiments, a compute instance of the MIS may be configured within an isolated virtual network (IVN) (also referred to as a virtual private cloud or VPC) set up on behalf of the client at the VCS. A DNI is an advanced networking feature support by a VCS, in some embodiments, which enables use cases like multicast streams, transitive routing, and load balancing. DNIs provide compute instances with Internet protocol suite layer 2 network access without intermediary translation/encapsulation or filtering. DNIs may support VLAN (virtual local area network) tags and customization of MAC (media access control) addresses. In various embodiments, in contrast to the traffic sent/received via VNIs, traffic on DNIs may not protected by security groups.

Figure 8:
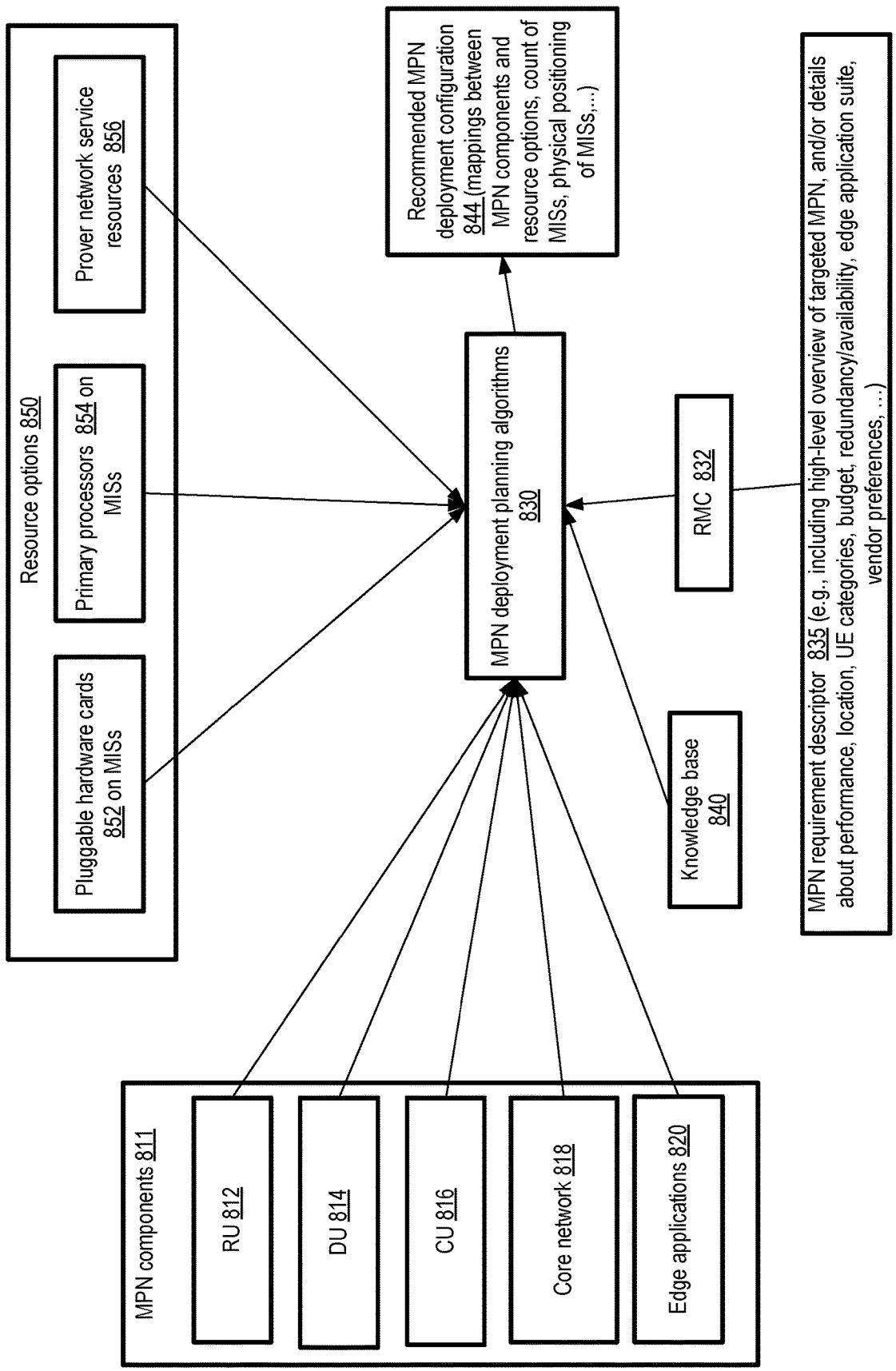
FIG. 8 illustrates example inputs which may be used to generate recommended MPN deployment configurations by a network-accessible service of a cloud provider network, according to at least some embodiments.

FIG. 8 illustrates example inputs which may be used to generate recommended MPN deployment configurations by a network-accessible service of a cloud provider network, according to at least some embodiments. The set of MPN components 811 which are to be executed at an MIS on behalf of a client may include network functions of an RU 812, a DU 814, a CU 816, core network 818, and edge applications 820 selected by the client. The resource options 850 for executing these components may include pluggable hardware cards 852 on MISs, primary processors 854 on the MISs, and provider network service resources 856 (such as compute instances of the VCS). Pluggable hardware cards 852 may themselves include two kinds of resources which can be used for the MPN components as discussed earlier—chipsets specialized for performing one or more types of network functions, and auxiliary processors which can be used for executing various network functions or applications. One objective of the MPN deployment recommendation generation procedure may be to choose, given a particular client's MPN requirements, which types of resources should be used for various ones of the MPN components, and how many resources of each such type are to be deployed.

An RMC 832 of an RBAMS similar in features and functionality to RBAMS 110 may obtain an MPN requirement descriptor 835 in the depicted embodiment. The descriptor may provide information such as a high-level overview of the targeted MPN, details about performance requirements (e.g., expected message rates from various UE devices, desired latencies for transmitting the messages or for processing data payloads of the messages), location requirements (e.g., the size of the building, facility, or external site) at which the MPN is to be deployed and used, expected distribution of the workload of the MPN (physical location distribution, temporal distribution, etc.), the types of UE devices expected to be used, a target budget for implementation and use of the MPN, redundancy/availability requirements for the MPN (e.g., expressed as the maximum number of acceptable down-time minutes per year or similar units), the specific types of edge applications desired, preferences for particular third-party vendors whose pluggable cards are to be used at the MISs, and so on.

The MPN requirements may be provided as input to a set of MPN deployment planning algorithms 830 in the depicted embodiment. In some embodiments, the requirements may be reformatted by the RMC according to a standardized format expected by the algorithms 830 before being provided to the algorithms. In at least one embodiment, the input of the algorithms may include records, stored in a knowledge base 840 maintained at the cloud provider network, of similar MPN requirements and corresponding deployments that were successful in achieving the objectives of the MPNs. The MPN deployment planning algorithms may use various heuristics and rules (e.g., "a given MIS of category A can typically handle arriving messages at no more than rate R1 from a set of UE devices of type T1 spread over an area of A square meters") to generate a recommended MPN deployment configuration 844 in the depicted embodiment. The recommended MPN deployment configuration may indicate, for example, mappings between the MPN components and the resource options, the count of MISs to be deployed at the targeted location, the physical positioning of the MISs (e.g., distances between pairs of MISs to ensure high quality reception of signals) at that location, and so on. An example of a mapping M1 between the MPN components and resource options for a given MPN requirement descriptor may be represented as follows: {[RU/Lower L1: custom chipset from vendor V1 on pluggable card of MIS of category C1], [Upper L1, L2: auxiliary processors on pluggable card of MIS of category C1], [L3, UPF, Edge applications: containers on CPUs of MIS of category C1]}. Another mapping M2 generated for a different MPN requirement descriptor may be represented as follows: {[RU/Lower L1: custom chipset from vendor V2 on pluggable card of MIS of category C2], [Upper L1: auxiliary processors on pluggable card of MIS of category C2], [L2, L3, UPF: containers on CPUs of MIS of category C2], [Edge applications: containers at servers of class S1 in regional data center DC1 of cloud provider network]}. In each of these mappings, the specific types of resources to be used for different MPN components may be specified; for example, in M2, network functions of RAN layers L2 and L3 and UPF may be executed at CPUs of an MIS of a category C2 supported by the RBAMS.

In some embodiments, the RMC may generate an initial deployment configuration recommendation for an MPN based on the requirements provided by a client, but may later modify some mappings of the MPN components to resources, e.g., based on anticipated or detected changes in the workload level of the MPN. In one example scenario, according to the initial recommended deployment configuration, network functions of the RU, DU, CU, and core network may all be executed using the resources of an MIS. Later, based for example on an increase in the workload level of the MPN, the RMC may cause at least some of those network functions to be executed using provider network service resources 856 instead. Thus, for example, a core network function may be executed at the MIS as part of the processing of a set of messages received from a particular UE device during a first time interval after the initial deployment of the MIS; for subsequent messages from the same UE device, that core network function may instead be executed using a compute instance at a data center of the provider network. When making such dynamic changes in the mappings between MPN components and resources, the RMC may coordinate the establishment of connectivity between the newly-relocated portions of the MPN and the portions that have not been relocated. Some such changes may be temporary—for example, if the workload increases, a subset of network functions may in effect be migrated to the provider network from an MIS, and if the workload later decreases, the subset of network functions may be migrated back to the MIS. In some embodiments, such migrations or resource mapping modifications may be initiated based on anticipated or predicted changes in MPN workload, such as changes forecast using machine learning models or trend analysis statistics, or changes associated with special events whose dates/times are known in advance. In other embodiments, actual measurements of changes in MPN workloads, detected for example using a remote resource monitoring service of the provider network, may trigger such resource mapping modifications.

In at least one embodiment, one or more MISs that do not include pluggable hardware cards of the kind introduced above may be included in a recommended deployment configuration. For example, at such a server, all the network functions executed locally may run on the primary processors of the server.

Figure 9:
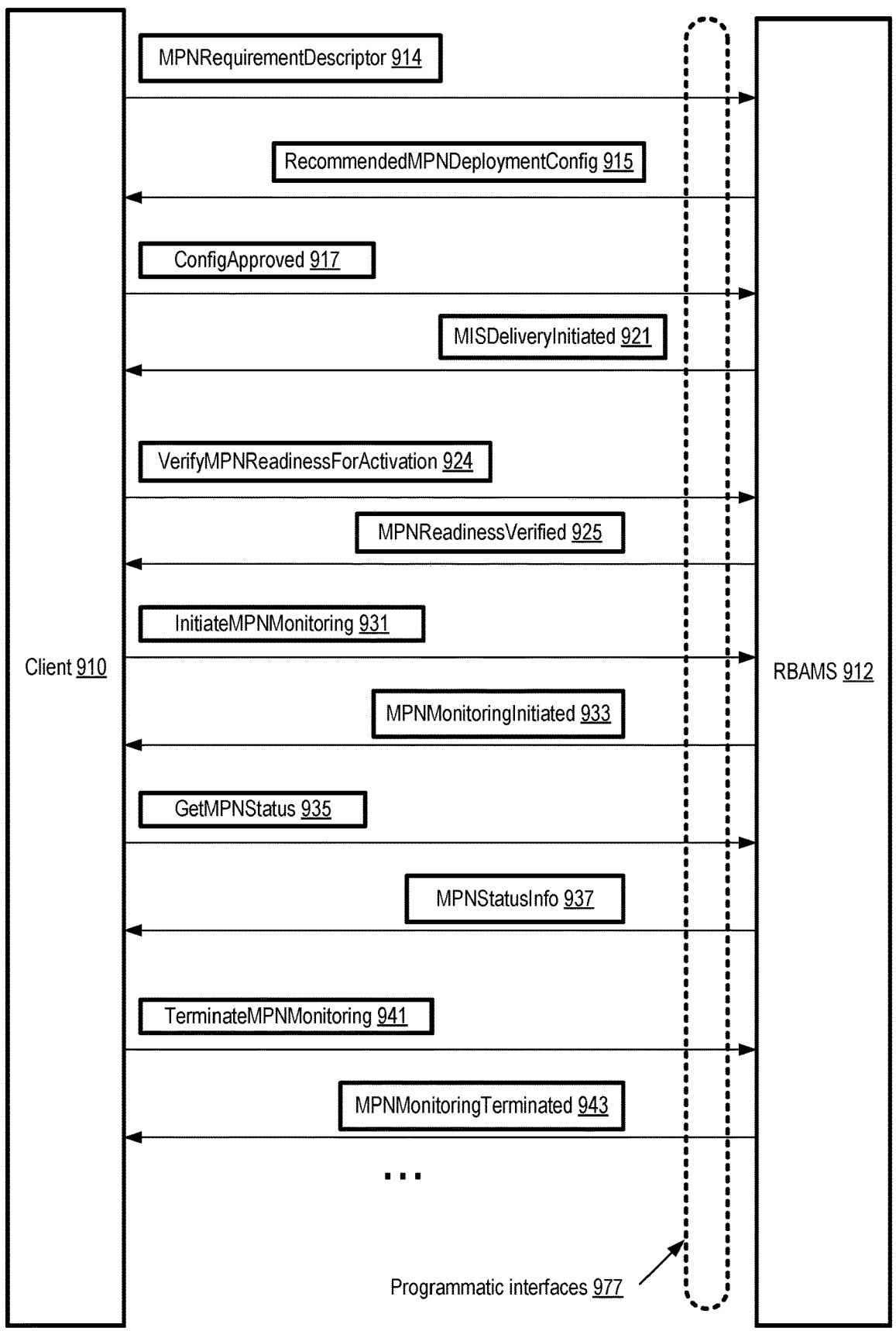
FIG. 9 illustrates example programmatic interactions, pertaining to MPN configuration and use, between clients and a provider network service, according to at least some embodiments.

FIG. 9 illustrates example programmatic interactions, pertaining to MPN configuration and use, between clients and a provider network service, according to at least some embodiments. In the depicted embodiment, an RBAMS 912 (similar in features and functionality to RBAMS 110 of FIG. 1) may implement a set of programmatic interfaces 977, such as web-based consoles, command-line tools, graphical user interfaces, APIs and the like, which can be utilized by clients 910 to submit messages or requests to the service and receive corresponding responses. A client 910 may, for example, submit a description of their requirements for a particular MPN via an MPNRequirementDescriptor message 914. In various embodiments, the RBAMS 912 may try to reduce the amount of effort clients have to expend in order to get their MPNs set up and running; clients may therefore be granted substantial flexibility with regard to the level of detail provided in a requirement descriptor. Some clients may only provide a high-level summary of their requirements, such as the logical equivalent of "I need to set up a private network for communicating with and controlling twenty industrial robots in my factory, which is A meters long and B meters wide." Other clients may provide more specifics about their MPN needs, such as some or all of the kinds of details listed above in the discussion of MPN requirement descriptor 835 of FIG. 8. The RBAMS may analyze the requirements, and generate a deployment recommendation, e.g., using the kinds of rules and heuristics discussed above. The recommendation may be provided to the client via a RecommendedMPNDeploymentConfig message 915 in the depicted embodiment.

The client 910 may indicate that the recommended configuration has been approved, and order delivery of the set of MISs indicated in the recommendation, via one or more ConfigApproved message 917 in the embodiment shown in FIG. 9. The MISs may be shipped to the targeted location for the MPN, and an MISDeliveryInitiated message 921 may be sent to the client via the programmatic interfaces 977. In some cases, the MISs approved for the MPN may be part of a pre-configured fleet of MISs of the RBAMS, with minimal or no additional configuration needed. In other cases, some amount of custom configuration may be performed at the RBAMS (e.g., one or more edge applications may be added or removed from a default pre-configured MIS, one or more pluggable cards may be added or removed from a default configuration, and so on). There may be some delay between the approval of the configuration and the initiation of delivery of the MISs (and the corresponding transmission of the MISDeliveryInitiated message) in some cases, with the delay dependent on the amount of customization required. In some embodiments, the RBAMS may configure all MISs from scratch after receiving approvals of recommended configurations, without maintaining a pre-configured set of MISs. In one embodiment, the RBAMS may provide an indication of the available default configurations of one or more categories of MISs via programmatic interfaces 977, and a client may simply order some number of such MISs of selected categories, without specifying requirements or obtaining a recommendation.

After an MIS (or a set of MISs) has been received at a location where an MPN is to be set up, the client may power on the MIS and connect the MIS to a local network and/or the Internet as part of the initialization of the MIS. A client may send a VerifyMPNReadinessForActivation request 924 to the RBAMS 912 in some embodiments, requesting the RBAMS to ensure that the MIS can be accessed from and managed with the help of the RBAMS. The RBAMS may in some embodiments verify connectivity of the MIS with a remote monitoring service of the provider network to confirm the readiness of the MPN for cloud-managed operation at the MPN location. In at least some embodiments, the software and hardware stack of the MIS may also be verified as part of the workflow. An MPNReadinessVerified message 925 may be sent to the client after the workflow is completed successfully in the depicted embodiment.

The MPN may be activated after its readiness has been verified, e.g., by starting up various programs implementing portions of the MPN stack in the depicted embodiment. An InitiateMPNMonitoring request 931 may be submitted to the RBAMS in some embodiments to indicate that MPN operations have commenced, and to request collection of monitored metrics from the MIS. An MPNMonitoringInitiated message 933 may be sent to the client to acknowledge that the monitoring of the MPN using provider network resources has begun.

The client may request various kinds of status information and metrics collected from the MPN by submitting a GetMPNStatus request 935 in some embodiments. A variety of metrics of the MPN, such as resource usage levels (CPU utilization, memory utilization, storage utilization, pluggable card chipset or auxiliary processor utilization, IP network bandwidth utilization), MPN message rates, MPN message latencies, error rates, and the like may be provided to the client via MPNStatusInfo messages 937. In some embodiments, a common console or graphical interface may be used by the client to view status and metrics of the MPN MISs as well as status and metrics of other resources of the client at one or more provider network services (such as compute instances at the VCS, storage servers or databases at provider network storage services, and the like). In some embodiments, clients may be billed by an RBAMS for the use of MISs on the basis of the amount of message traffic processed at the MISs, and the MPNStatusInfo may provide an indication of the billing costs incurred over various time intervals.

In some cases, an MPN may only need to be activated for a relatively small amount of time, such as a few weeks or days during which a special event (such as a conference) occurs at the target location of the MPN. The client may deactivate the MPN after its period of intended use has ended, e.g., by simply powering off the MISs used in some embodiments. In one embodiment, a client may submit a TerminateMPNMonitoring request 941 to the RBAMS to notify the RBAMS that the MISs used for an MPN are no longer to be used, and the monitoring of the MPN using provider network resources may be ended. An MPNMonitoringTerminated message 943 may be sent to the client to confirm that the RBAMS is aware that the MPN is no longer in use. Other types of programmatic interactions pertaining to implementation of MPNs may be supported in some embodiments than those shown in FIG. 9.

Figure 10:
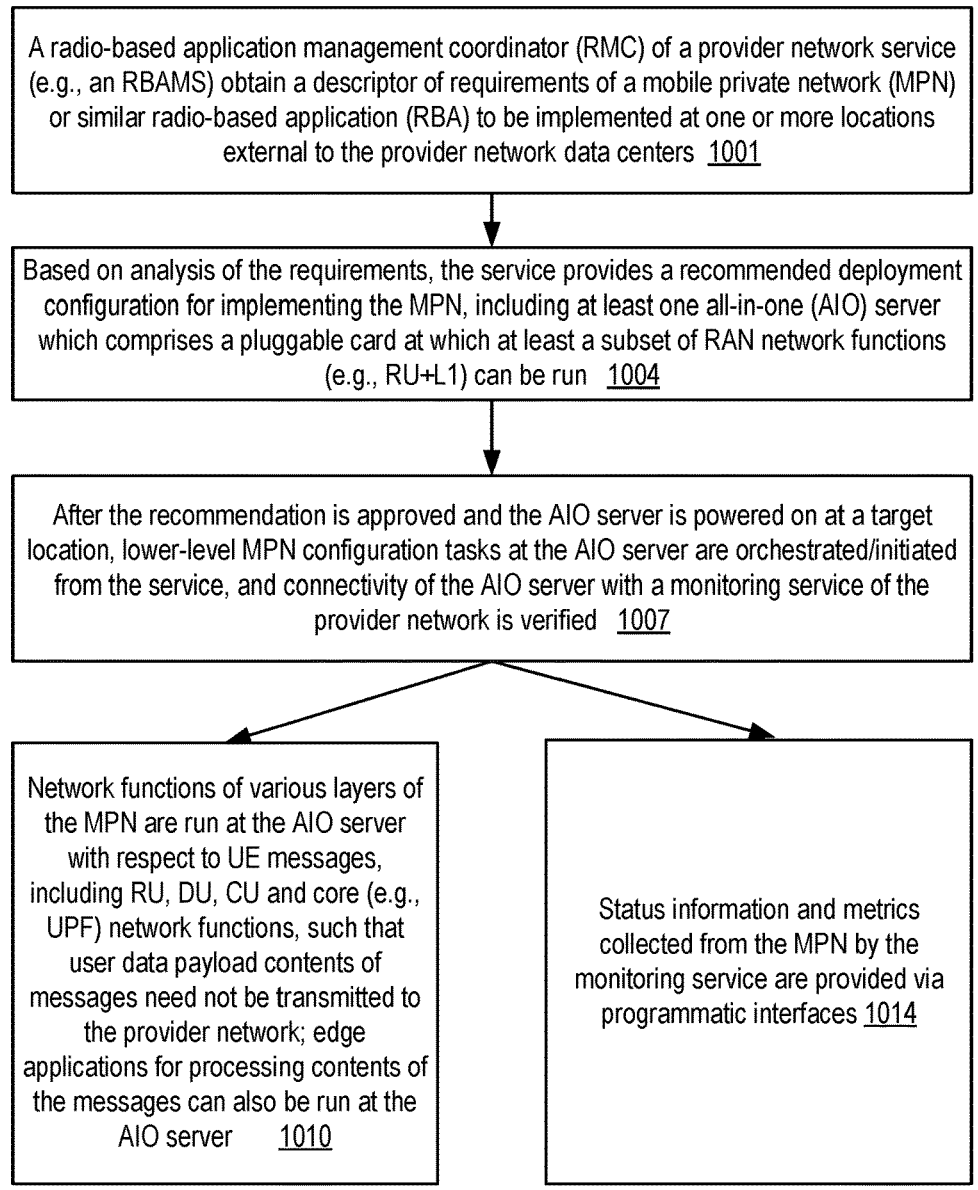
FIG. 10 is a flow diagram illustrating aspects of operations which may be performed to deploy and manage MPNs with the help of a provider network service, according to at least some embodiments.

FIG. 10 is a flow diagram illustrating aspects of operations which may be performed to deploy and manage MPNs with the help of a provider network service, according to at least some embodiments. As shown in element 1001, an RMC implemented at a provider network service similar to RBAMS 110 of FIG. 1 may receive or obtain a descriptor of requirements of an MPN or similar RBA to be implemented at one or more locations external to the data centers of the provider network, e.g., from a client of the cloud provider network in the depicted embodiment. Various types of requirements and/or constraints may be indicated in the descriptor, including for example performance (latency and message rate) requirements, physical location or placement constraints (e.g., constraints on the space available for installing servers at the target sites where the MPN is to be used), a requirement indicating a radio spectrum frequency range to be used at the MPN, a requirement indicating a preferred vendor of a hardware card used for implementing one or more tasks of the MPN, an electrical power constraint (indicating limits on the aggregate power that can be consumed by the servers used for implementing the MPN), the numbers and kinds of UE devices expected to use the MPN, physical dimensions of the building within which the MPN is to be set up or the outdoor are within which the MPN is to be set up, redundancy/availability requirements, ambient temperature ranges, data processing edge application requirements, monitoring requirements, the target budget/cost range of the MPN from the client's perspective, and so on.

Based at least in part on analysis of the requirements, the service may provide a recommended deployment configuration for implementing the MPN at the targeted location or locations (element 1004) in various embodiments. The recommended configuration may include at least one all-in-one server which includes a pluggable card at which at least a subset of RAN network functions of the MPN, including RU network functions and L1 functions of the DU, can be run. In at least some embodiments, only a single server may be included in the recommended configuration, which can simplify the deployment of the MPN substantially compared to solutions in which multiple servers have to be configured at the targeted locations.

After the recommendation is approved by the client, and the AIO server is powered on or activated at a target location, lower-level MPN configuration tasks may be orchestrated at the AIO server from the service (element 1007), e.g., by a MPN server configuration manager). Network connectivity of the AIO with a monitoring service of the provider network may also be verified in some embodiments.

Processing of messages of the MPN may then be initiated in the depicted embodiment. Network functions of various layers of the MPN are run at the AIO server with respect to received UE messages, including RU, DU, CU and core network (e.g., UPF) network functions, such that user data payloads of the received UE messages need not be transmitted to the provider network's data centers (element 1010). Edge applications for processing contents of the messages may also be run at the AIO server in some embodiments.

Status information and metrics collected from the AIO server of the MPN by the monitoring service may be provided to clients via programmatic interfaces (element 1014). Such programmatic interfaces may also be used, if desired, to modify configuration of the MPN. It is noted that in various embodiments, some of the operations shown in the flow diagram of FIG. 10 may be implemented in a different order than that shown in the figure, or may be performed in parallel rather than sequentially. Additionally, some of the operations shown in FIG. 10 may not be required in one or more implementations.

Figure 11:
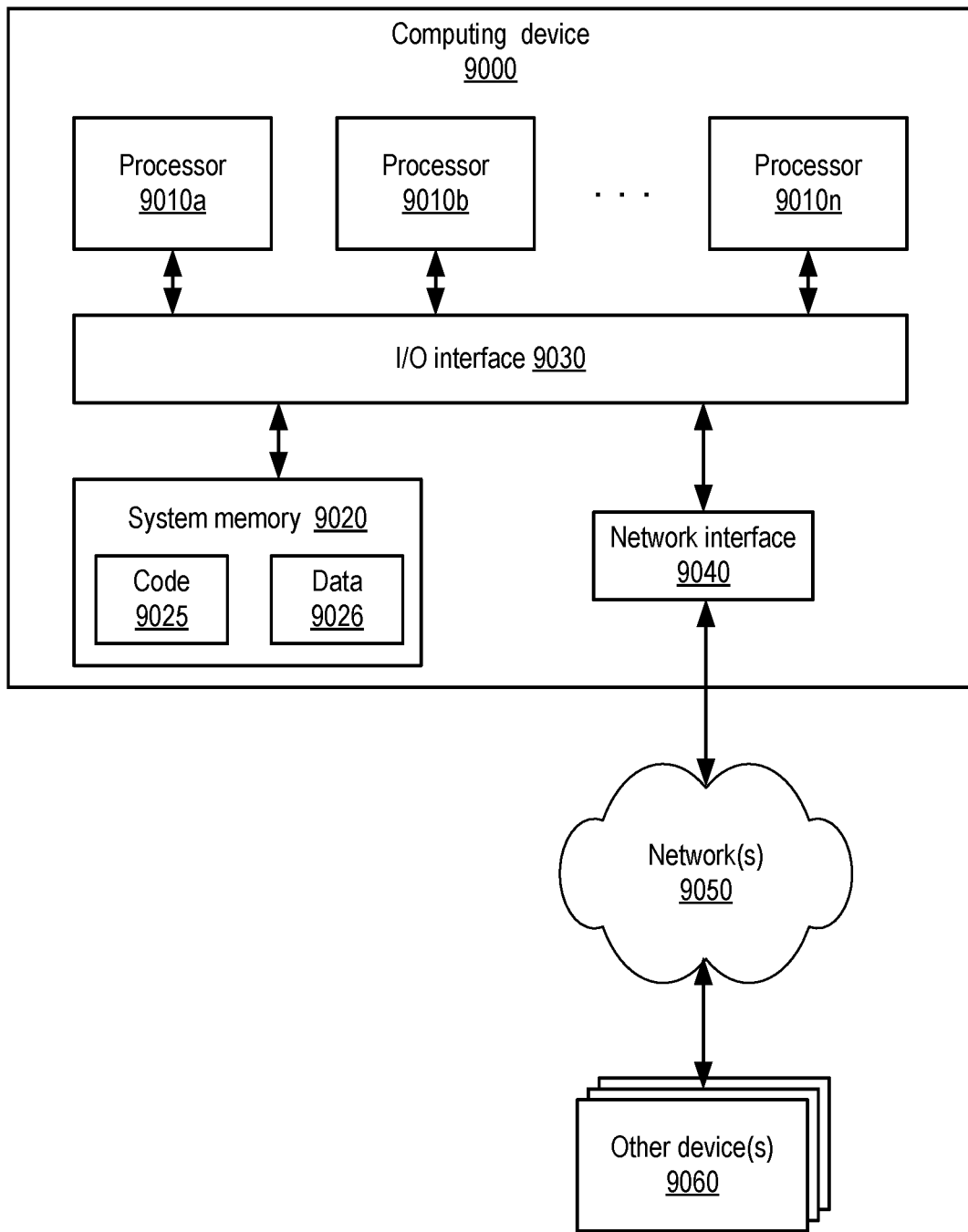
FIG. 11 is a block diagram illustrating an example computing device that may be used in at least some embodiments.

In at least some embodiments, a server that implements the types of techniques described herein (e.g., various functions of a provider network service such as an RBAMS, including MIS functions), may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 10. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
  a radio-based application management coordinator of a cloud provider network; and
  a plurality of mobile private network (MPN) implementation servers, including an MPN implementation server comprising a pluggable card, wherein the pluggable card includes a set of chips for executing at least (a) a first network function of a radio unit (RU) of a radio access network (RAN) node of a radio-based technology stack and (b) a second network function of a distributed unit (DU) of the RAN node;
  wherein the radio-based application management coordinator is configured to:
    receive, from a client of the cloud provider network via a programmatic interface, an MPN requirement descriptor comprising performance requirements of an MPN to be implemented at least in part at a location external to the cloud provider network;
    transmit, to the client, a recommended deployment configuration for implementing at least a portion of the MPN, wherein the recommended deployment configuration is generated based at least in part on analysis of the MPN requirement descriptor, and wherein the recommended deployment configuration comprises the MPN implementation server;
    verify, after the recommended deployment configuration has been approved by the client and the MPN implementation server has been powered on at the location, that connectivity has been established between the MPN implementation server and a remote monitoring service of the cloud provider network; and
    cause a set of metrics collected by the remote monitoring service from the MPN implementation server to be presented to the client; and
  wherein the MPN implementation server is configured to:
    receive a message from a user equipment (UE) device of the MPN;
    execute a set of network functions of the MPN with respect to the message, without transmitting a data payload of the message to the cloud computing environment, wherein the set of network functions includes the first network function executed at the pluggable card, the second network function executed at the pluggable card, a third network function of a centralized unit (CU) of the RAN node, and a fourth network function of a user plane function (UPF) layer of a core network of the radio-based technology stack.

2. The system as recited in claim 1, wherein the set of chips of the pluggable card is configured to execute one or more of: (a) the third network function (d) or the fourth network function.

3. The system as recited in claim 1, wherein the MPN implementation server comprises a primary processor at which a set of instructions is executed to implement one or more of: (a) another network function of the DU, (b) the third network function or (c) the fourth network function.

4. The system as recited in claim 1, wherein the MPN implementation server comprises a set of primary processors at which a set of instructions is executed to implement an application which processes data payloads of messages transmitted via the MPN, including a data payload of the message received from the UE device.

5. The system as recited in claim 1, wherein the pluggable card is linked to a primary processor of the MPN implementation server via a peripheral interconnect.

6. A computer-implemented method, comprising:
  generating, at a cloud computing environment, a first recommended deployment configuration for a first mobile private network (MPN), wherein the first recommended deployment configuration includes a first server at which at least a portion of a radio unit (RU) of a radio access network (RAN) node of a radio-based technology stack is implemented;
  verifying, after the first recommended deployment configuration has been approved and the first server has been activated at a location external to the cloud computing environment, that connectivity has been established between the first server and a monitoring service of the cloud computing environment;
  executing a plurality of network functions of the first MPN at the first server with respect to a message received from a user equipment (UE) device of the first MPN, including an RU network function, a distributed unit (DU) network function of the RAN node, a centralized unit (CU) network function of the RAN node, and a network function of a core network layer; and causing status information, collected from the first server by the monitoring service, to be presented via a programmatic interface.

7. The computer-implemented method as recited in claim 6, wherein the first server comprises a hardware card, wherein the hardware card comprises a chip set configured to execute one or more of: (a) the RU network function, (b) the DU network function, (c) the CU network function or (d) the network function of the core network layer.

8. The computer-implemented method as recited in claim 6, wherein the first server comprises a set of primary processors at which a set of instructions are executed to implement one or more of: (a) the DU network function, (b) the CU network function of the CU or (c) the network function of the core network layer.

9. The computer-implemented method as recited in claim 6, wherein the network function of the core network layer comprises a user plane function (UPF).

10. The computer-implemented method as recited in claim 9, further comprising:

executing one or more other network functions of the core network layer at a second server.

11. The computer-implemented method as recited in claim 6, further comprising:

installing, at the first server at the cloud computing environment, prior to deployment of the first server at the location external to the cloud computing environment, a set of data processing applications; and executing, at the first server with respect to a data payload of the message, a data processing application of the set of data processing applications.

12. The computer-implemented method as recited in claim 11, wherein the set of user data processing applications comprises one or more of: (a) a machine learning application, (b) an Internet-of-Things (IoT) device management application or (c) an application provided by a client of the cloud computing environment on whose behalf the first server is deployed.

13. The computer-implemented method as recited in claim 6, further comprising:

receiving, at the cloud computing environment, a first set of requirements of the first MPN, wherein the first set of requirements includes one or more of: (a) a performance requirement, (b) a location constraint, (c) a requirement indicating a radio spectrum frequency used for messages of the first MPN, (d) a requirement indicating a particular vendor of a hardware card used for implementing one or more tasks of the first MPN, or (e) an electrical power constraint, wherein the first recommended deployment configuration is generated based at least in part on analysis of the first set of requirements.

14. The computer-implemented method as recited in claim 13, further comprising:

receiving, at the cloud computing environment, a second set of requirements of a second MPN, wherein the second set of requirements includes at least one requirement which is not included in the first set of requirements; and generating, at the cloud computing environment, a second recommended deployment configuration for the second MPN based at least in part on analysis of the second set of requirements, wherein the second recommended deployment configuration includes a second server, wherein the second server differs from the first server in one or more of: (a) a performance capacity of a set of primary processors, (b) memory size, or (c) a particular hardware card incorporated within the second server, which can be used to execute one or more network functions.

15. The computer-implemented method as recited in claim 6, wherein the first recommended deployment configuration for the first MPN does not include any servers other than the first server.

16. A non-transitory computer-accessible storage medium storing program instructions that when executed on a processor:

verify, after a server for implementing a plurality of layers of a radio-based application has been powered on at a location external to a cloud computing environment, that connectivity has been established between the server and a monitoring service of the cloud computing environment;

cause a plurality of network functions of the radio-based application to be executed at the server with respect to a message received from a user equipment (UE) device, including a radio unit (RU) network function, a distributed unit (DU) network function, a centralized unit (CU) network function, and a network function of a core network layer; and cause status information, collected from the server by the monitoring service, to be presented via a programmatic interface.

17. The non-transitory computer-accessible storage medium as recited in claim 16, wherein the server comprises a hardware card, wherein the hardware card comprises a chip set configured to execute one or more of: (a) the RU network function, (b) the DU network function, (c) the CU network function or (d) the network function of the core network layer.

18. The non-transitory computer-accessible storage medium as recited in claim 16, wherein the server comprises a set of software containers for executing one or more of: (a) the DU network function, (b) the CU network function or (c) the network function of the core network layer.

19. The non-transitory computer-accessible storage medium as recited in claim 16, storing further program instructions that when executed on the processor:

generate an initial recommended deployment configuration for implementing the radio-based application at the location external to the cloud computing environment, wherein the initial recommended deployment configuration includes the server, and wherein the initial recommended deployment configuration indicates that the plurality of network functions of the radio-based application are to be run at the server; and cause, in response to a change in workload level of the radio-based application, at least one network function of the plurality of network functions to be executed, with respect to another message received from the UE device, at a resource other than the server.

20. The non-transitory computer-accessible storage medium as recited in claim 16, storing further program instructions that when executed on the processor:

receive, prior to deployment of the server at the location external to the cloud computing environment, an indication of a data processing application to be executed on data transmitted via the radio-based application; and cause the data processing application to be installed at the server.

\* \* \* \* \*